US011955748B2

(12) United States Patent
Ishaug et al.

(10) Patent No.: US 11,955,748 B2
(45) Date of Patent: Apr. 9, 2024

(54) CONNECTOR COUPLING

(71) Applicant: Amphenol Corporation, Wallingford, CT (US)

(72) Inventors: Braden Ishaug, Eden Prairie, MN (US); Song Wai Trang, Alhambra, CA (US); Brendon Aaron Baldwin, Guilford, NY (US)

(73) Assignee: Amphenol Corporation, Wallingford, CT (US)

( * ) Notice: Subject to any disclaimer, the term of this patent is extended or adjusted under 35 U.S.C. 154(b) by 259 days.

(21) Appl. No.: 17/163,923

(22) Filed: Feb. 1, 2021

(65) Prior Publication Data

US 2022/0052482 A1 Feb. 17, 2022

Related U.S. Application Data

(60) Provisional application No. 63/124,030, filed on Dec. 10, 2020, provisional application No. 63/065,473, filed on Aug. 13, 2020.

(51) Int. Cl.
*H01R 13/625* (2006.01)
*H01R 13/622* (2006.01)
*H01R 13/631* (2006.01)

(52) U.S. Cl.
CPC ......... *H01R 13/625* (2013.01); *H01R 13/622* (2013.01); *H01R 13/631* (2013.01)

(58) Field of Classification Search
CPC .. H01R 13/625; H01R 13/622; H01R 13/631; H01R 13/6583
See application file for complete search history.

(56) References Cited

U.S. PATENT DOCUMENTS

| | | | |
|---|---|---|---|
| 2,728,895 | A | 12/1955 | Quackenbush et al. |
| 3,917,373 | A | 11/1975 | Peterson |
| 4,208,082 | A | 6/1980 | Davies et al. |
| 5,399,096 | A | 3/1995 | Quillet et al. |
| 5,435,760 | A | 7/1995 | Miklos |
| 5,653,605 | A | 8/1997 | Woehl et al. |

(Continued)

OTHER PUBLICATIONS

International Search Report and Written Opinion for International Application No. PCT/US2021/016038, dated May 25, 2021.

*Primary Examiner* — Abdullah A Riyami
*Assistant Examiner* — Nader J Alhawamdeh
(74) *Attorney, Agent, or Firm* — Wolf, Greenfield & Sacks, P.C.

(57) ABSTRACT

Embodiments herein include a connector coupling arranged to mate and/or unmate first and second connectors. The connector coupling includes a first collar having one or more locking members, a second collar arranged to receive the first collar, the second collar being rotatable relative to the first collar, and a locking mechanism. The connector coupling is moveable in a mating direction to mate the first and second connectors and an unmating direction to unmate the connectors. The locking mechanism is disengaged when the connector coupling is moved in a mating direction. For example, the locking mechanism may be moveable from a first engaged position to a first disengaged position when the connector coupling is moved in the mating direction. As another example, the locking mechanism may remain disengaged until the connectors are fully mated.

26 Claims, 33 Drawing Sheets

(56) References Cited

U.S. PATENT DOCUMENTS

| | | | | |
|---|---|---|---|---|
| 5,957,716 | A | 9/1999 | Buckley et al. | |
| 6,086,400 | A | 7/2000 | Fowler | |
| 6,123,563 | A | 9/2000 | Johnson et al. | |
| 6,293,595 | B1 | 9/2001 | Marc et al. | |
| 7,905,741 | B1 * | 3/2011 | Wade | H01R 13/639 439/321 |
| 7,914,311 | B1 * | 3/2011 | Gallusser | H01R 13/639 439/321 |
| 8,579,644 | B2 * | 11/2013 | Cole | H01R 33/9753 439/312 |
| 9,666,973 | B1 * | 5/2017 | Strahl | H01R 13/622 |
| 2005/0064752 | A1 | 3/2005 | Serino | |
| 2009/0163066 | A1 | 6/2009 | Vanzo | |
| 2013/0244466 | A1 | 9/2013 | Cole et al. | |
| 2014/0273583 | A1 * | 9/2014 | Baldwin | H01R 13/622 439/314 |
| 2022/0052482 | A1 * | 2/2022 | Ishaug | H01R 13/622 |

* cited by examiner

CONNECTOR COUPLING

CROSS-REFERENCE TO RELATED APPLICATIONS

This application claims priority under 35 U.S.C. § 119(e) to U.S. Provisional Application No. 63/065,473, filed Aug. 13, 2020 and entitled "CONNECTOR COUPLING", and U.S. Provisional Application No. 63/124,030, filed Dec. 10, 2020 and entitled "CONNECTOR COUPLING", each of which is herein incorporated by reference in its entirety.

FIELD

The disclosed embodiments relate to couplings for an electrical connector.

BACKGROUND

Electrical connector assemblies generally include a mating plug and a receptacle connector and typically include a mating or coupling mechanism. For example, a threaded nut or collar may be used to mate the plug and receptacle connectors.

Examples of some couplings for electrical connector assemblies include U.S. Pat. Nos. 7,914,311, 6,293,595, 6,123,563, 6,086,400, 5,957,716, 5,435,760, 5,399,096, 4,208,082, 3,917,373, and U.S. Pat. No. 2,728,895.

SUMMARY

In some embodiments, a connector coupling includes a first collar, a second collar arranged to receive the first collar, the second collar being rotatable relative to the first collar; and a locking mechanism having a first ratchet ring with one or more locking members that are engageable with one or more locking members on the first collar or one or more locking members locking members on a second ratchet ring. The connector coupling is arranged to move in a first direction to mate first and second connectors. When the connector coupling is moved in the first direction, the locking mechanism is disengaged.

According to another embodiment, a connector coupling includes a first collar having one or more locking members and a first channel, the first channel having a mating path and an unmating path, a second collar arranged to receive the first collar, the second collar being rotatable relative to the first collar, the second collar having a first pin receivable in the first channel, a ratchet ring having one or more locking members engageable with the locking members of the first collar. The connector coupling is arranged to move in a first direction to mate first and second connectors and a second, opposite, direction to unmate the first and second connectors. The first pin is arranged to move in the mating path when the second collar is moved in the first direction and in the unmating path when the second collar is moved in the second direction.

According to another embodiment, a method of mating and/or unmating first and second connectors via a connector coupling is disclosed. The connector coupling includes a first collar, a second collar arranged to receive the first collar and being rotatable relative to the first collar, and a locking mechanism having a first ratchet ring with one or more locking members engageable with one or more locking members of the first collar or one or more locking members of a second ratchet ring. The method includes moving the connector coupling in a first direction to mate the first and second connectors, wherein the locking mechanism is disengaged during the act of moving the connector coupling in the first direction.

According to still another embodiment, a connector coupling includes a first collar, a second collar arranged to receive the first collar, the second collar being rotatable relative to the first collar, the second collar having first and second pins, and a locking mechanism having first and second ratchet rings, wherein each of the first and second ratchet rings includes locking members that engage with one another. The first pin is arranged to engage with a first channel formed in the first ratchet ring. The second pin is arranged to engage with a second channel formed in the first collar.

According to yet another embodiment, a connector coupling includes a first collar, a second collar arranged to receive the first collar, the second collar being rotatable relative to the first collar, and a locking mechanism having a first ratchet ring with one or more locking members that are engageable with one or more locking members on a second ratchet ring. The connector coupling is arranged to move in a first direction to mate first and second connectors. The locking mechanism is arranged to remain disengaged until the connector is fully mated.

It should be appreciated that the foregoing concepts, and additional concepts discussed below, may be arranged in any suitable combination, as the present disclosure is not limited in this respect.

The foregoing and other aspects, embodiments, and features of the present teachings can be more fully understood from the following description in conjunction with the accompanying drawings.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Electrical connector assemblies generally include mating plug and receptacle connectors and typically include a mating or coupling mechanism. For example, a threaded nut or collar may be used to mate the plug connector and the receptacle connector. An electrical contact and wire may be connected to each of the plug and receptacle connectors in some embodiments.

As is known, full mating, also known as bottoming, is an industry wide issue. For example, not fulling mating the plug and receptacle connectors may result in premature failures, such as decoupling, fretting corrosion, and poor shell-to-shell conductivity. Loosening and/or decoupling of the connectors also may occur when the connectors are subject to vibration or shock. For example, loosening and/or decoupling may occur when a coupling nut of a connector coupling counter rotates. In such an example, the coupling nut may rotate in a direction opposite to a mating or locking direction. In some instances, this may compromise the integrity of both the mechanical and electrical connection between the plug and receptacle connectors. Accordingly, the inventors have recognized the benefits of having a connector coupling that may resist counter rotation, such as by providing a connector with a positive locking feature that may only be manually disengaged (e.g., manually unlocked) by a user.

Figure 1:
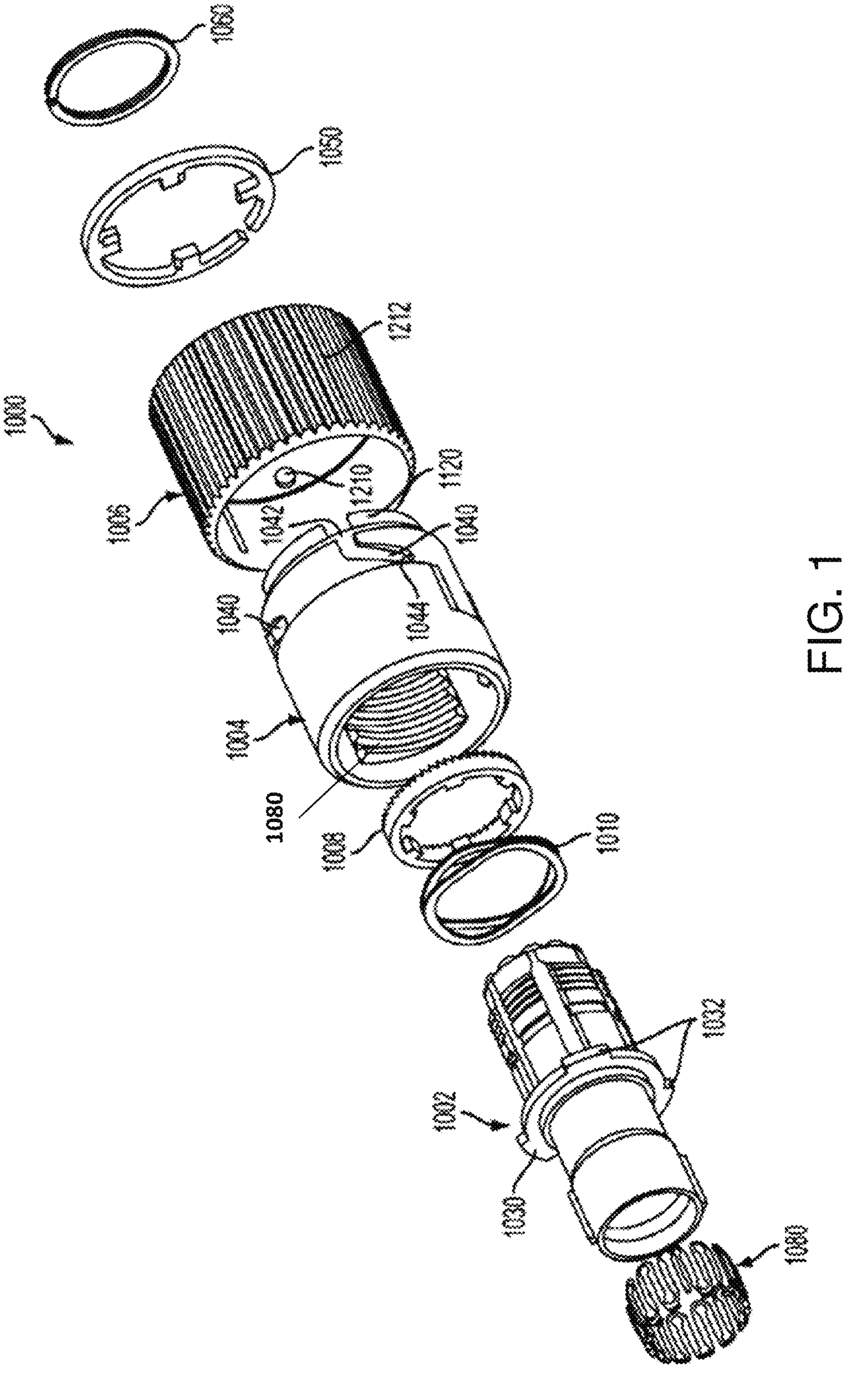
FIG. 1 is an exploded perspective view of the inventors' earlier-described connector coupling.

FIG. 1 shows an example of the inventors' earlier described connector coupling (see U.S. Pat. No. 7,905,741, entitled "Anti-Vibration Connector Coupling with an Axially Moveable Ratchet Ring" and issued Mar. 15, 2011, which is herein incorporated by reference in its entirety), which is arranged to allow locking between plug and receptacle connectors via a ratchet engagement, and thereafter to allow manual unlocking by the user. In this connector coupling, mating may occur in a first, mating direction, while unmating may occur in a second, opposite direction (referred to as an unmating direction). As will be appreciated mating may include engagement between ratchet teeth of the ratchet engagement and locking members of an inner collar while unmating may include disengagement of the ratchet teeth.

In such connector couplings, a high level of input torque may be required to mate and fully bottom the plug and receptacle connectors, such an input torque between about 20-22 in/lb force. In such couplings, a user may need to use one or more coupling tools to fully mate the connectors or else risk loosening and/or decoupling. As will be appreciated, in some embodiments, requiring one or more coupling tools to fully bottom the connectors may be inconvenient, make an installation more challenging, and/or result in inconsistent or incomplete couplings.

The inventors have thus recognized the benefits of reducing the level of input torque required to mate and fully bottom the connectors. For example, according to some embodiments of the present disclosure, full mating may be achieved without the use of a tool, although it will be appreciated that a tool also may be used with one of the disclosed coupling connectors.

In some arrangements, advantages may be realized by allowing the positive locking feature of the connector coupling to be purposefully disengaged by the user both when the connector coupling is being moved in the mating direction and in the unmating direction. In other instance, benefits may be realized by maintaining the positive locking feature (e.g., the locking mechanism) in a disengaged position until the connectors are mated.

In some embodiments, the disclosed connectors may lower the user input torque required to reach full mate bottoming between the plug and receptacle connectors. In some embodiments with this arrangement, the inventors have recognized that a level of input force needed for mating may be reduced from about 20-22 in/lb force to between about 8-12 in/lb force. For example, the level of input force needed for mating may be between about 8-10 in/lb force in some embodiment with this arrangement. In some embodiments, a level of input force for unmating (e.g., to disengage the locking mechanism) may have a similar value to the mating force.

In some embodiments, the disclosed connectors may provide a smoother mating sequence. For example, in some embodiments, locking teeth may be disengaged from each other during mating, which may eliminate the friction and/or torque losses associated with the engaged and ratcheting locking teeth. In some embodiments, a higher percentage of the user input torque may be applied directly to the threaded coupling interface, reducing the user torque needed to fully bottom and mate the plug and receptacle connectors. In some embodiments, this may allow the user to mate the connectors manually and eliminate the need for any coupling tools. This also may lower the ratio of engagement to disengagement torque needed. For example, the engagement torque may be reduced and may more closely align with the disengagement torque required to unmate the connectors. In an illustrative example, a ratio between the mating torque and the unmating torque may be approximately 1:1.

The inventors have further recognized the benefit of including a timing mechanism in a coupling connector to control and, in some embodiments, indicate the progression of mating. In some embodiments, the timing mechanism may include a spring actuator. In other embodiments, the timing mechanism may include a torque actuator.

In some embodiments, the connector coupling may be arranged to indicate the mating status of the plug and receptacle connectors to the user. For example, in some embodiments, the connector coupling may include one or more indicators arranged to indicate the mating status to the user. In some embodiments, the connector coupling is arranged to indicate when full mating has been established between the plug and receptacle connectors. The indicator also may indicate an unmated connection or the start of the mating process. In some embodiments, the full mate indicator may include an audible, visual, or tactile indication, or combinations thereof.

According to some embodiments disclosed herein, a connector coupling is arranged to allow disengagement of the locking mechanism both when the connector coupling is being moved in a mating (e.g., connector locking) direction and also when the connector coupling is being moved in the unmating (e.g., connector unlocking) direction. In some embodiments, the connector coupling includes an outer collar, an inner collar received in the outer collar, the inner collar having one or more locking members, and a locking mechanism with corresponding locking members that engage with the locking members of the inner collar. For example, the locking mechanism may include a ratchet ring with one or more ratchet teeth that engage with corresponding ratchet teeth on the inner collar. In some embodiments, the outer collar is rotatable relative to the inner collar (e.g., in the mating and unmating directions) to engage and disengage the locking mechanism. In some embodiments, the connector coupling also includes a biasing member, which may bias the locking members of the locking mechanism (e.g., the ratchet ring) in an engaged position.

In some embodiments, the connector coupling may be moved in a first, mating direction, which may disengage the locking members of the inner collar and ratchet ring. In such embodiments, when connectors are fully bottomed and after disengagement of the locking members, the user may release the connector coupling. Releasing the connector coupling may then reengage the corresponding locking members. As with the above, the connector coupling may remain in this mating position until the user purposefully disengages the locking members to unmate the connectors. For example, the connector coupling may be moved in a second, opposite, unmating direction, to disengage the locking members of the inner collar and ratchet ring, after which point the user may separate the connectors.

In some embodiments, the inner collar includes one or more channels to receive corresponding pins on the outer collar. For example, in some embodiments, the one or more channels may include one or more channels arranged to receive corresponding pins on the outer collar. For example, the one or more channels may include bayonet channels and the one or more pins may include bayonet pins. It will be appreciated that other suitable fasteners and/or other suitable arrangements for the channels and pins may be employed.

In some embodiments, the bayonet channels may assist with disengagement of the locking members in the mating and unmating directions. For example, in some embodiments, each bayonet channel may include an open end, a first mating path, and a second unmating path. In such embodiments, the mating path may correspond to a path the bayonet pin travels when the connector coupling is moved in the mating direction, while the unmating path may correspond to a path the bayonet pin travels when the connector coupling is moved in the unmating direction. In some embodiments, each of the paths may include a closed end, such as for engaging with the corresponding bayonet pin.

In some embodiments, the mating and unmating paths may be connected via a home position. In some embodiments, the home position corresponds to an engaged position of the locking mechanism (e.g., ratchet ring), such as an engaged position between the locking members of the inner collar and the ratchet ring. For example, the bayonet pin may return (e.g., snap back) to the home position after travelling in the mating path, disengagement of the locking members of the inner collar and ratchet ring during mating of the connector, and subsequent reengagement of the locking members after full bottoming of the connectors. In some embodiments, the bayonet pin may be biased in a direction towards the home position (e.g., via a biasing member).

In other embodiments, the inner collar may include a continuous bayonet channel extending around the circumference of the inner collar. In such embodiments, the channel may include multiple mating and unmating paths that are connected to one another via one or more home positions. For example, in some embodiments, the channel may include at least three mating and unmating paths and three home positions, each mating path being adjacent to an unmating path. In such embodiments, the pin may travel into the mating path and then to an adjacent home position (e.g., via an adjacent unmating path) after disengagement of the locking members of the inner collar and ratchet ring during mating of the connectors and subsequent engagement of the locking members.

In some embodiments, the bayonet pin may travel in the unmating path, which may result in disengagement of the locking members of the inner collar and ratchet ring to unmate the connectors. In such embodiments, the connector may then be separated.

In some embodiments, the mating and unmating paths may each include a ramp along which the bayonet pin travels. For example, the bayonet pin may travel up at least a portion of the ramp of the mating path to disengage the locking mechanism. In some embodiments, the bayonet pin may be arranged to travel a distance along the ramp corresponding to a height of the locking mechanism, such as a height of the ratchet teeth of the ratchet ring. For example, the bayonet pin may travel up the ramp until the teeth of the ratchet ring and the teeth of the inner collar may be separated. As is the case with travel in the mating path, after disengagement between the teeth and bottoming of the connectors, the bayonet pin may travel down the ramp to the home position to allow the teeth of the ratchet ring and the teeth of the inner collar to engage with one another and hold the mating position of the connectors.

The inventors have recognized the benefits of angling the ramp of the mating and/or unmating paths. For example, in some embodiments, a ramp angle of the mating path may be set such that an input torque is equal to or greater than a torque needed to bottom the plug to the receptacle. In some embodiments, the ramp angle may be set such that a spring-loaded locking ring is allowed to automatically become engaged once the user releases the outer locking collar. In such embodiments, a height of the channel may correspond to a back force of the spring. In some embodiments, the ramp may allow the pin to travel up and over the ramp such as to indicate achieving good plug and receptacle mating. As will be appreciated, the bayonet pin may be arranged to return to the home position once proper mating of the connector is achieved.

The inventors have recognized that having a ramp angle that is too sharp (e.g., too steep) may result in an input torque level being too high. In some embodiments, this may result in insufficient mating. For example, requiring too high of an input torque level may impede pin travel along the mating path and, in turn, mating of the plug and receptacle. The inventors have also recognized that having a ramp angle that is too shallow may prevent the locking member from automatically re-engaging after the user releases an outer collar. Accordingly, in some embodiments, the ramp may be angled between about 0 and about 90°. For example, in some embodiments, the ramp may be angled about 45°.

According to other embodiments disclosed herein, the connector coupling may be arranged such that the locking mechanism remains in a disengaged position until the connectors are mated. For example, in some arrangements, the locking teeth of one of the ratchet rings may remain disengaged (e.g., spaced apart) from the locking members of the other ratchet ring until full mating of the connectors. In such an example, once connectors are fully mated, the locking members are engageable to lock the connectors together. In an illustrative example, the locking teeth may be moved towards each other when inner and outer collars are moved relative to one another but remain spaced apart from one another until the connector are fully bottomed. In such an example, once a prescribed force and torque is achieved, the locking members (e.g., ratchet teeth) are engageable to lock the connectors together.

Similar to the above, the connector coupling may include an outer collar, an inner collar, a locking mechanism, and a biasing member. In some embodiments, the locking member may include first and second ratchet rings with corresponding locking teeth. In some embodiments, the outer collar may include multiple pins, such as bayonet pins, engageable with the first ratchet ring. The outer collar also may engage with the inner collar.

Turning now to the figures, FIG. 1 shows the inventors' prior described connector coupling 1000 (also referred to herein as the "coupling"). As shown in this figure, the connector coupling may include an inner collar 1004, an outer collar 1006, a ratchet ring 1008, and a biasing member 1010. In some embodiments, the connector coupling may be disposed on a connector body 1002, which may be the shell of a plug connector. In some embodiments, the inner collar 1004 may accept the connector body while the outer collar receives the inner collar. In such embodiments, the ratchet ring and biasing member are disposed between the connector body and the inner and outer collars.

Figure 4:
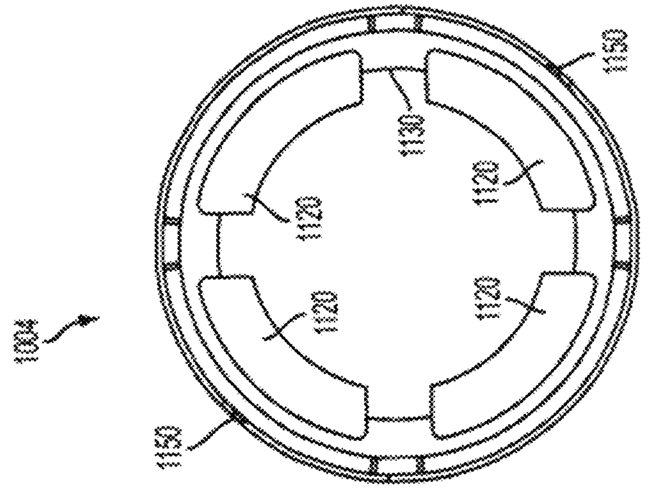
FIG. 4 is an elevation view of a second end of the inner collar of FIG. 2.
Figure 3:
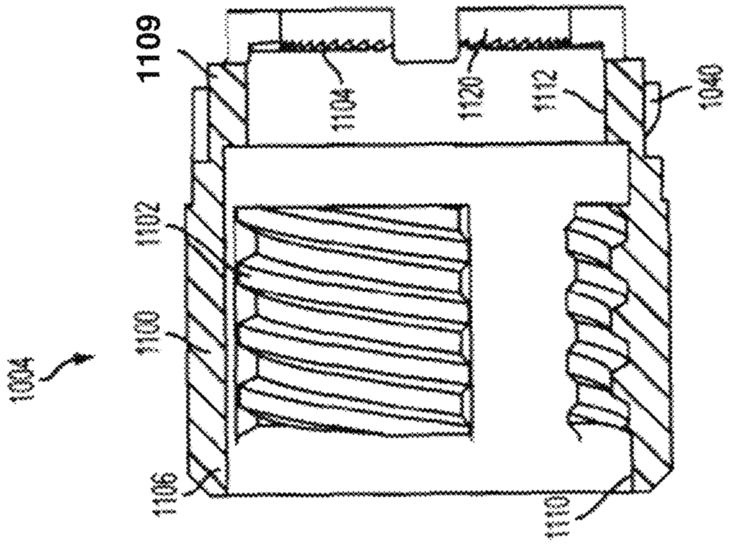
FIG. 3 is a cross-sectional view of the inner collar taken along line 3-3 of FIG. 2.
Figure 2:
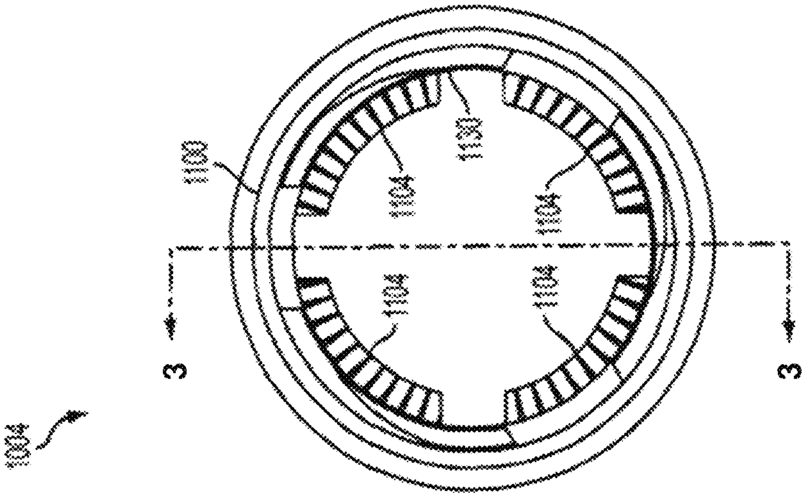
FIG. 2 is an elevation view of a first end of an inner collar of the connector coupling of FIG. 1.
Figure 5:
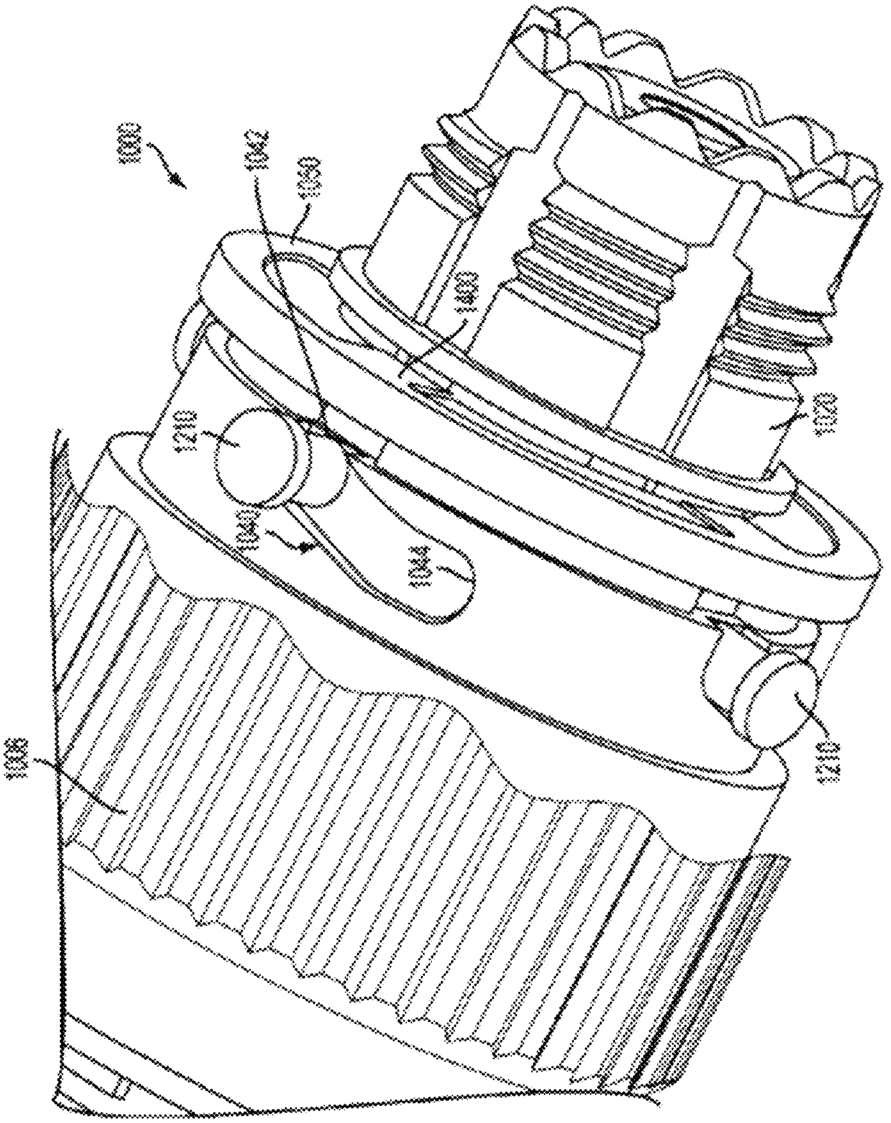
FIG. 5 is a perspective view of the coupling of FIG. 1, showing an outer collar in a first position and a ratchet ring in an engaged position, a portion of the outer collar being shown cut away.
Figure 6:
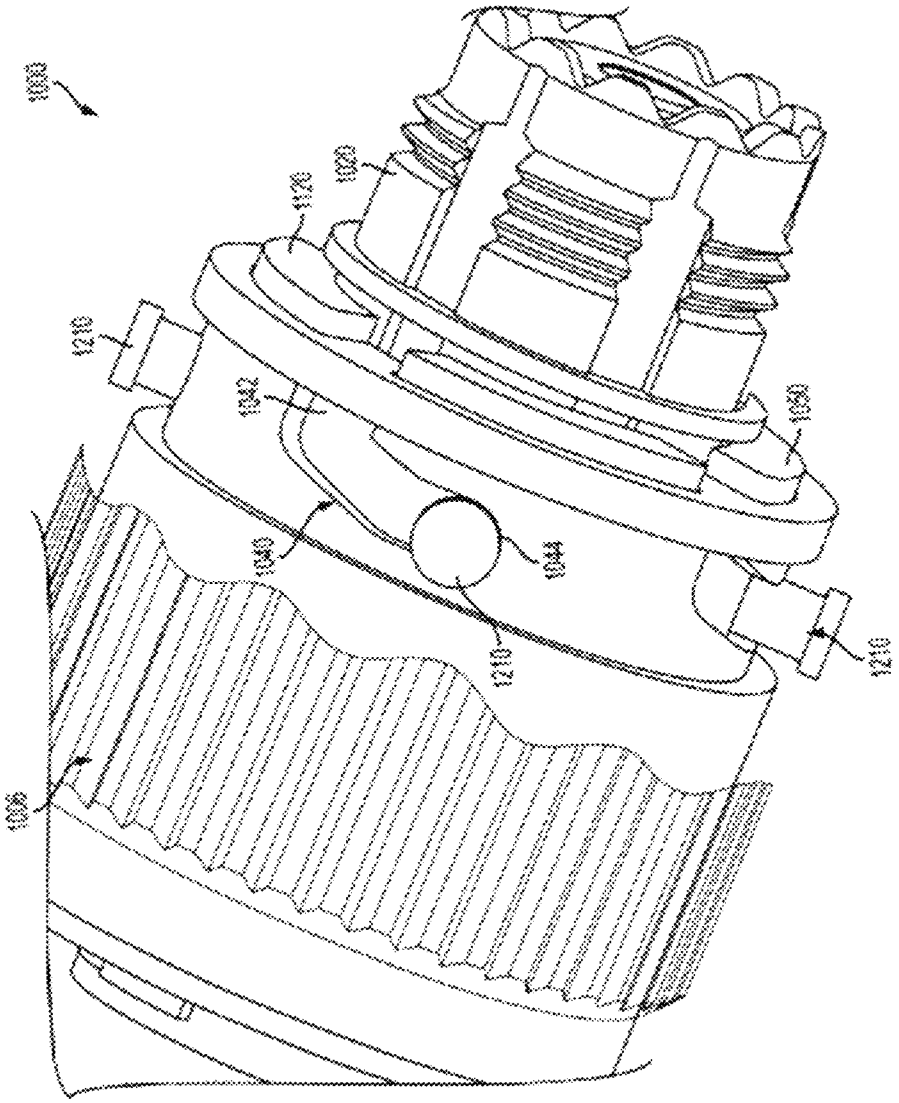
FIG. 6 is a perspective view of the coupling of FIG. 1, showing the outer collar in a second position and a ratchet ring in a disengaged position, a portion of the outer collar being shown cut away.

As shown in FIGS. 2-4, the inner collar 1004 may include a main body 1100 with inner threads 1102 for engaging the mating connector, and a plurality of locking members 1104 (e.g., teeth), for engaging corresponding locking members (e.g., ratchet teeth) on the ratchet ring 1008. The main body 1100 may include first and second opposite ends 1106, 1109, that define first and second openings 1110, 1112, respectively, through which the connector body 1002 extends. In some embodiments, the second end 1109 may be arranged to engage the outer collar 1006 via an engagement mechanism that allows the outer collar 1006 to rotate with respect to the inner collar 1004 between a first position (see FIG. 5) where the locking members are engaged, and a second position (see FIG. 6) where the locking members are disengaged. In such embodiments, the engagement mechanism may be moved in the second direction during unmating of the connectors. In some embodiments, the engagement mechanism may include one or more bayonet channels 1040 on the inner collar (e.g., at the second end 1109) and corresponding bayonet pins 1210 on the outer collar (see FIG. 1). In some embodiments, as shown in at least FIGS. 5 and 6, the bayonet pins may travel along the corresponding bayonet channels 1040 during unmating of the connector coupling.

Figure 7:
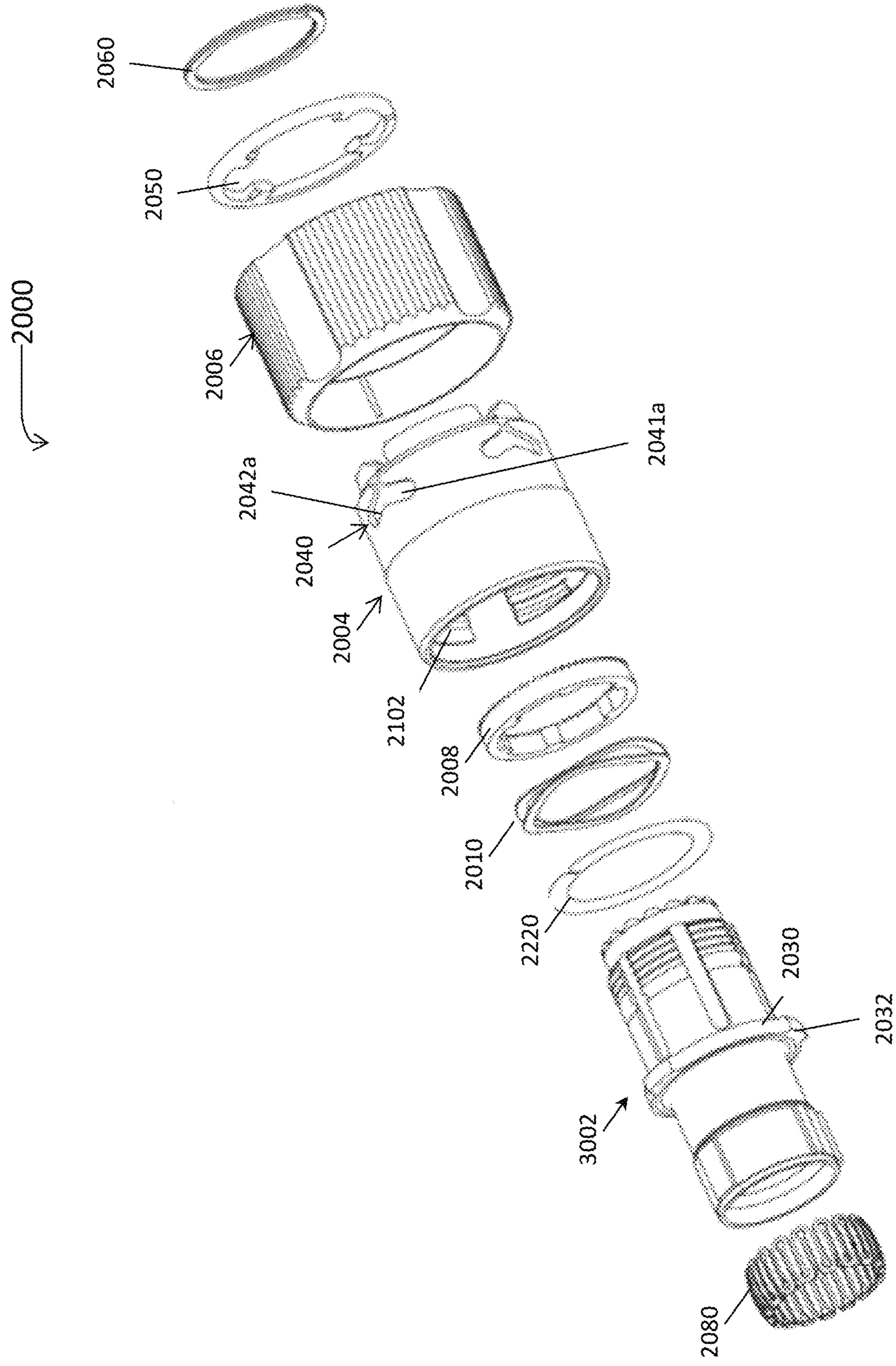
FIG. 7 is an exploded perspective view of a connector coupling according to embodiments of the present disclosure.

FIG. 7 shows a connector coupling according to embodiments of the present disclosure. As with the above, the connector coupling may include an inner collar 2004, an outer collar 2006, a locking mechanism such as a ratchet ring 2008, and a biasing member 2010. In some embodiments, the biasing member may include a wave spring for biasing the coupling into the engaged position, although other suitable biasing members may be used. In some embodiments, the connector coupling may be disposed on a connector body 2002, such as the shell of a plug connector. In some embodiments, the inner collar 2004 may accept the connector body while the outer collar receives the inner collar. In such embodiments, the ratchet ring and biasing member may be disposed between the connector body and the inner and outer collars.

As shown in FIG. 7, the connector coupling may include a grounding band 2080, which, in some embodiments, may be provided between the connector body 2002 and the inner collar 2004. In some embodiments, the grounding band may be used to fill in a gap between metal to metal interference (e.g., an uneven surface) and may serve as an energy storage to reduce movement between the connectors, such as during vibration.

The connector coupling also may include a first retaining clip 2220, which may surround the connector body. In some embodiments, the first retaining clip may be arranged to reside in an annual groove of the inner collar. In some embodiments, an outer flange 2030 of the connector body 2002 may create a stop to prevent the first retaining clip and the inner collar from moving with respect to the connector body. For example, in some embodiments, the retaining clip may minimize or even prevent the inner collar from moving forward (e.g., moving axially) with respect to the connector 102.

As will be appreciated, the connector may include additional retaining clips on the connector body in other embodiments, such as to minimize or even prevent movement (e.g., axial movement) of the inner collar in an opposite, backward direction. For example, in some embodiments, as shown in FIG. 7, a second retaining clip 2060 may be provided on the connector body outside of the outer collar. In some embodiments, the second retaining clip 2060 may be arranged to retain the inner collar, the outer collar, the ratchet ring, and the biasing member on the connecting body.

In some embodiments, as shown in FIG. 7, the connector coupling may include an actuating ring 2050. In some embodiments, the actuating ring may be received in the second collar. In some embodiments, the actuating ring may be arranged to surround and engage with at least a portion of the inner collar.

Figure 9:
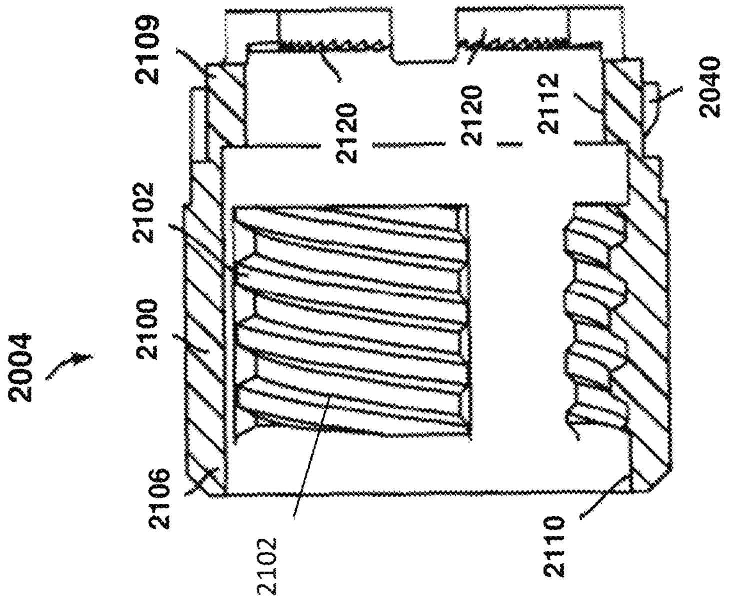
FIG. 9 is a cross-sectional view of the inner collar taken along line 9-9 of FIG. 8.
Figure 8:
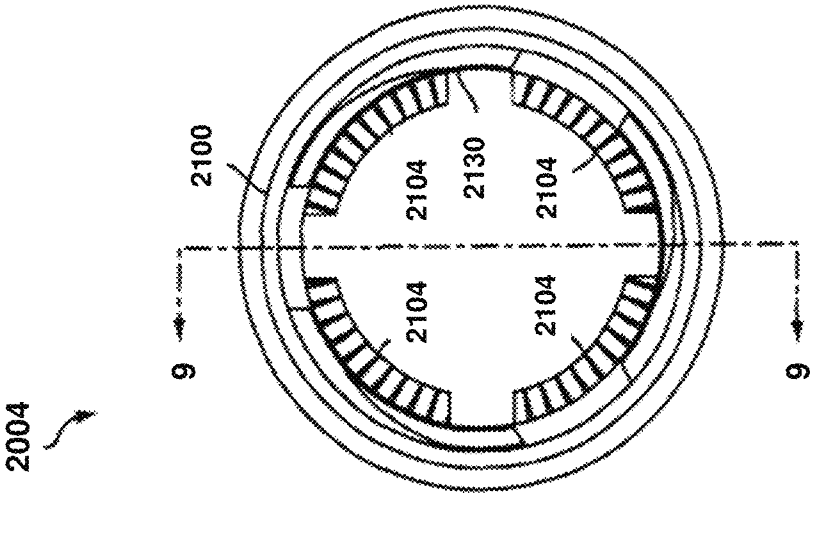
FIG. 8 is an elevation view of a first end of an inner collar of the connector coupling of FIG. 7.

As shown in FIGS. 7-9, the inner collar 2004 may include a main body 2100 with inner threads 2102 for engaging the mating connector. The inner collar also may include a plurality of locking members 2104, such as teeth, for engaging with corresponding locking members (e.g., teeth) on the ratchet ring 2008. The main body 2100 may include first and second opposite ends 2106, 2109 that define first and second openings 2110, 2112, respectively, through which the connector body 2002 extends. In some embodiments, the second end 2109 may be arranged to engage the outer collar 2006 via an engagement mechanism that allows the outer collar to rotate with respect to the inner collar.

Figure 10:
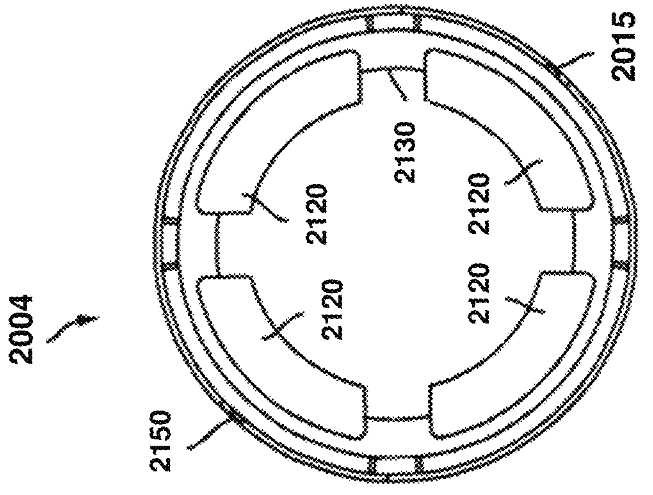
FIG. 10 is an elevation view of a second end of the inner collar of FIG. 8.

As shown in FIGS. 9 and 10, a plurality of projections 2120 may extend from a second end 2110 of the main body 2100 of the inner collar. In some embodiments, the projections define a diameter of the second opening 2112 of the main body such that the second opening is smaller than the first opening. In some embodiments, each projection may include opposite inner and outer surfaces. In such embodiments, the inner surface may face the internal threads 2102. The projections 2120 may extend through slots in the actuating ring. In this regard, the shape and size of the projections may correspond with the shape and size of the slots in the actuating ring.

In some embodiments, the locking members 2104 may extend from spaced apart projections 2120 extending inwardly from the second end 2109 of the inner collar 2004 (see, e.g., FIGS. 8 and 9). In some embodiments, the locking members 2104 may extend axially with respect to the main body of the inner collar and toward the interior of the body. As shown in FIG. 10, in some embodiments, slots 2130 may be formed between each of the projections 2120.

As will be appreciated, although four slots and four corresponding projections are shown in these embodiments, in other embodiments, the inner collar may have other numbers of slots and projections. For example, in some embodiments, the inner collar may include two, three, or more than four projections and corresponding slots.

In some embodiments, the inner collar 2004 is arranged to rotate with respect to the connector body 2002, such as for mating and unmating the connectors. In some embodiments, the outer flange 2030 of the connector body (see FIG. 7) may serve as a stop to minimize or even prevent the inner collar 1004 from moving relative to the connector body. For example, the outer flange may prevent the collar from moving axially forwards with respect to the connector body 2002. In some embodiments, the inner collar may include interference bumps 2150 (see FIG. 10) that engage with the outer collar 2006.

Figure 12:
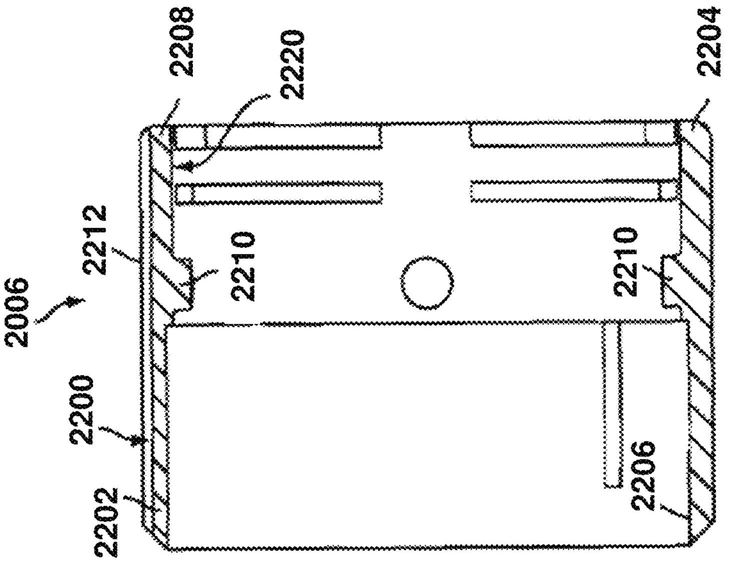
FIG. 12 is a cross-sectional view of the outer collar taken along line 12-12 of FIG. 11.
Figure 11:
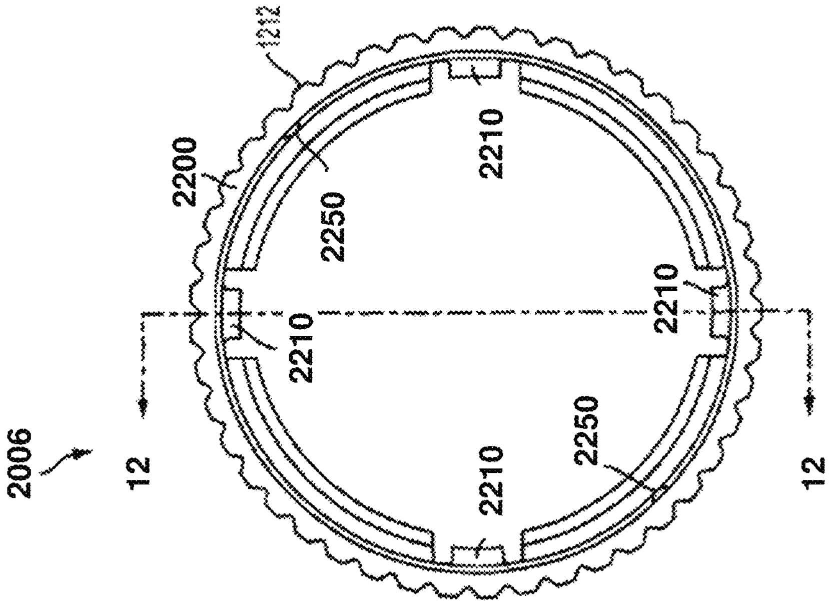
FIG. 11 is an end elevation view of an outer collar according to some embodiments.

FIGS. 11 and 12 illustrate the outer collar 2006 according some embodiments. As seen in these views, the outer collar 1006 may include a main body 2200 with opposite first and second ends 2202, 2204 that define first and second openings 2206, 2208, respectively. The main body 2200 of the outer collar may include an outer gripping surface 2212 (see also FIG. 7), which may facilitate rotational movement of the outer collar relative to the inner collar.

In some embodiments, as shown in FIG. 12, one or more bayonet pins 2210 may extend inwardly from the inner surface of the outer collar. In some embodiments, the bayonet pin(s) extend radially inwardly from the inner surface of the outer collar. In some embodiments, the bayonet pin(s) are arranged to cooperate with the bayonet channels 2040 of the inner collar. As will be appreciated, the shape and size of the bayonet pin(s) may correspond with the shape and size of the bayonet channel. In some embodiments, the pins may be substantially rectangular in cross-sectional shape, although the pins may be circular, triangular, square, other polygonal or other suitable shape. In some embodiments, each pin may include a head, which in some embodiments is larger than the channel. In such embodiments, the pin head may prevent the pin from moving out of the channel.

In some embodiments, the bayonet pin(s) may be integrally formed with the outer collar. For example, the bayonet pin(s) and outer collar may be a monolithic structure. In other embodiments, the pins may be removably attachable to the outer collar. In other embodiments, the pins may be separately formed and attachable to the outer collar. For example, the pins may be glued or otherwise fixedly attached to the outer collar.

In some embodiments, as shown in FIGS. 11 and 12, the outer collar may include inner radial grooves 2220. In some embodiments, the grooves may be arranged to receive the actuating ring 2050 (see FIGS. 7, 13, and 14). In some embodiments, the outer collar also may include interference bumps 2250, such as on the inner surface, to correspond with the bumps 2150 on the inner collar.

Figure 14:
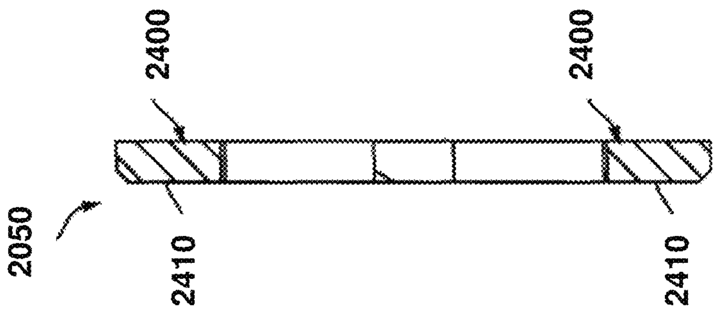
FIG. 14 is a cross-sectional view of the actuating ring taken along lines 14-14 of FIG. 13.
Figure 13:
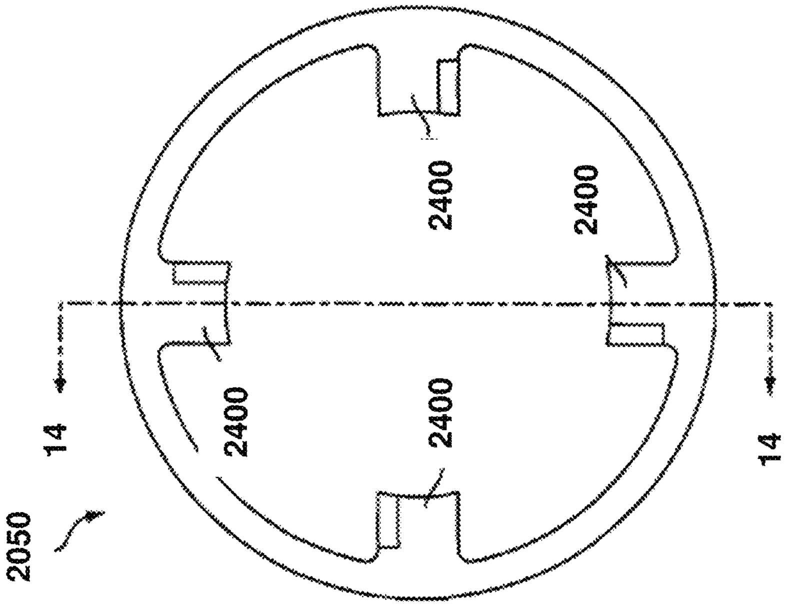
FIG. 13 is an elevation view of an actuating ring according to some embodiments.

As shown in FIGS. 13 and 14, the actuating ring 2050 may include one or more inner projections 2400. In such embodiments, the projections may extend radially inwardly from an inner surface of the actuating ring. The projections 2400 may be spaced and sized to be received in the slots 2130 between the projections 2120 of the inner collar (see FIG. 10). In some embodiments, each projection 2400 includes a surface 2410 that is adapted to abut a locking member 2304 of the ratchet ring 2008 (see FIGS. 15 and 16). In some embodiments, the actuating ring 2050 is receivable in the inner groove 2220 of the outer collar 2006. In such embodiments, the actuating ring may surround the projections 2120 at the second end 2109 of the inner collar 2004.

Figure 16:
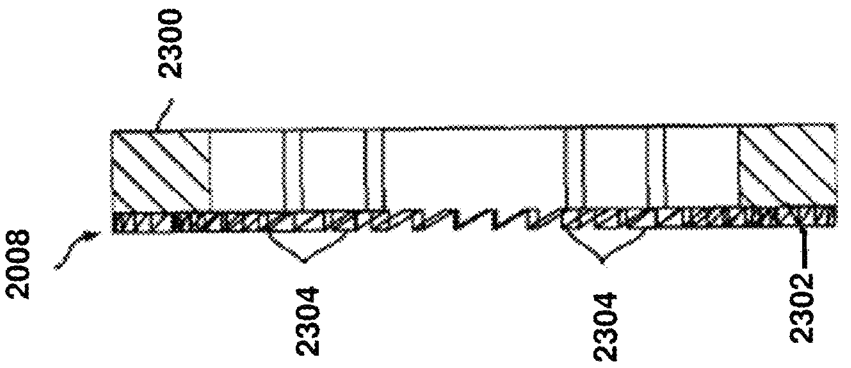
FIG. 16 is a cross-sectional view of the ratchet ring taken along line 16-16 of FIG. 15.
Figure 15:
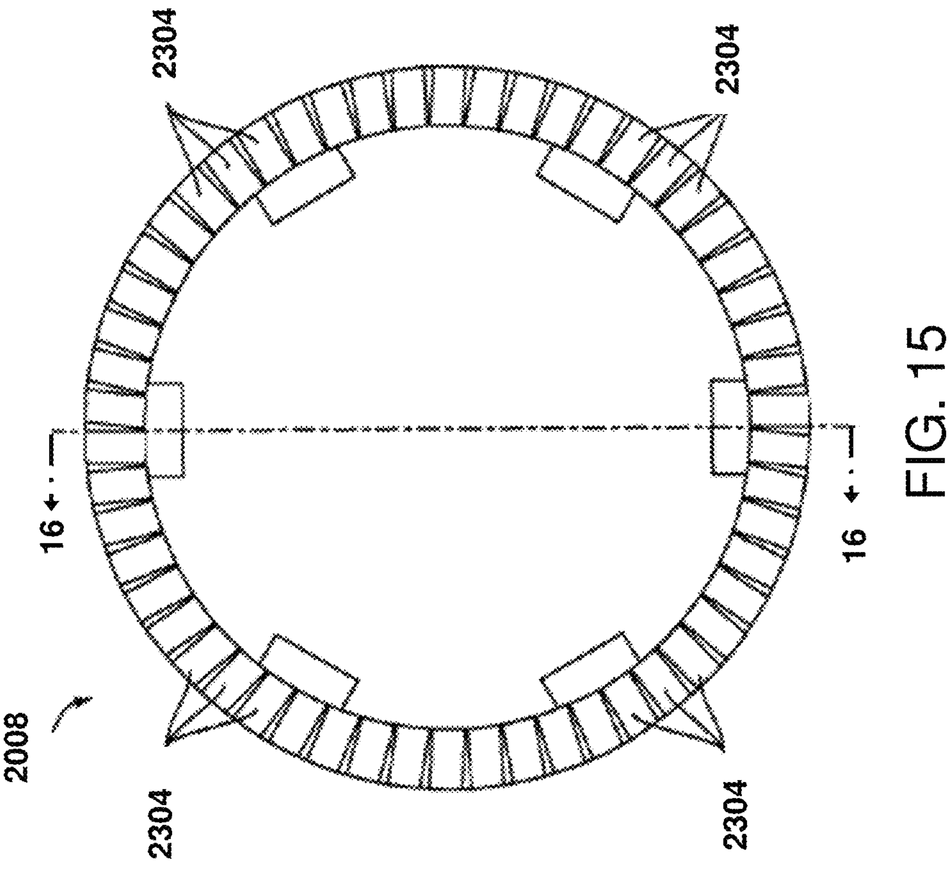
FIG. 15 is an elevation view of a ratchet ring according to some embodiments.

In some embodiments, the ratchet ring 2008 may be positioned on the connector body 2002 between its outer flange 2030 and the outer collar 2006. As seen in FIGS. 7, 15, and 16, the ratchet ring 2008 may include opposite first and second surfaces 2300 and 2302. The first surface 2300 may be generally flat and adapted to abut the biasing member 2010. The second surface 2302 may include the plurality of locking members 2304 engageable with the locking members 2014 of the inner collar. In some embodiments, as shown in these figures, the locking members may include teeth extending from the second surface.

As will be appreciated, the shape and size of the locking members (e.g., teeth) of the ratchet ring may correspond to the shape and size of the locking members (e.g., teeth) of the inner collar. For example, in some embodiments, the locking members of the inner collar and the locking members of the ratchet ring may have cooperating angled and flat surfaces to create a one-way ratchet engagement. In some embodiments, the teeth on the ratchet mechanism may have a height of between about 0.01 and about 0.02 inches. For example, the height of the teeth may be about 0.015 inches.

Figure 17:
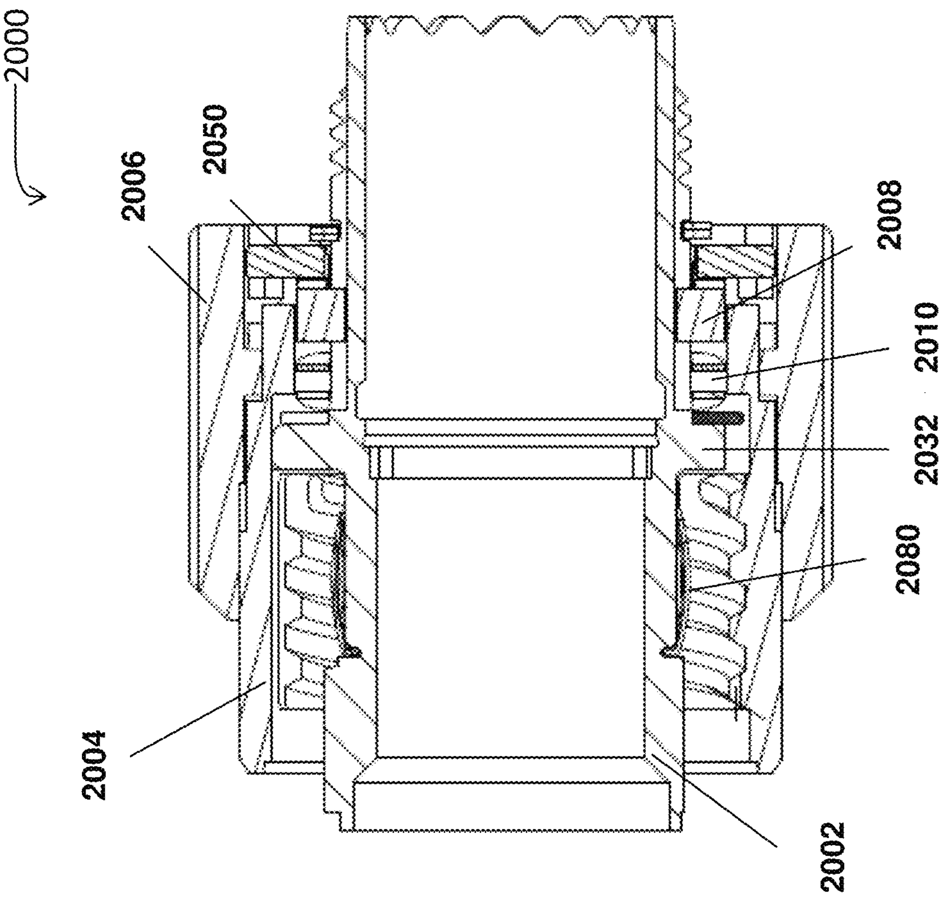
FIG. 17 is a cross-sectional view of an assembled connector according to some embodiments.

FIG. 17 shows a cross-sectional view of an assembled coupling. As shown in this view, when assembled the actuating ring 2050 may be positioned in the inner groove 2220 of the outer collar. The outer collar 2006 may surround both the inner collar 2004 and the actuating ring 2050, with the actuating ring surrounding the second end 2109 of the inner collar 2004 with the projections. As shown in FIG. 17, the connector body 2002 may extend through the first and second openings of the inner and outer collars 2004 and 2006. The retaining clip 2060 may be provided on the connector body 2002 outside of the outer collar 2006 to retain the inner collar 2004, the outer collar 2006, the ratchet ring 2008 and the biasing member 2010 on the connector body 2002. The grounding band 2080 may be provided between the connector body 2002 and the inner collar 2004.

Figure 18:
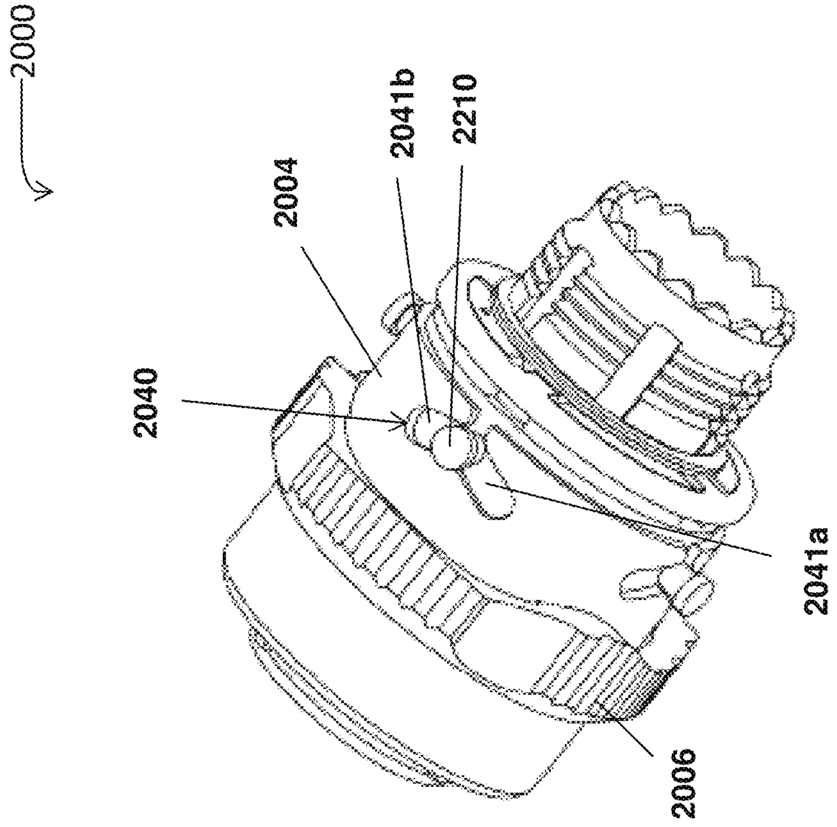
FIG. 18 is a perspective view of a connector coupling with a portion of an outer collar shown cut away, a ratchet ring of the connector coupling being in an engaged position.

FIG. 18 illustrates an assembled connector coupling with the bayonet pin 2210 shown in the home position and the ratchet ring in the engaged position (e.g., the locking members of the inner collar and locking members on the ratchet ring are in the engaged position). In some embodiments, in this engaged position, unmating of the connectors may be prevented unless and until the user manually moves the connector coupling in the unmating direction.

In some embodiments, the user may move the connector coupling in the mating direction multiple times. For example, in some embodiments, the user may wish to confirm that coupling is fully mated after a first turn of the connector coupling in the mating direction. As another example, a second user (e.g., a supervisor) may wish to verify that the first user properly mated the connectors. As will be appreciated, in both examples, after the first turn of the connector coupling, the bayonet pins may return to the home position as shown in FIG. 18.

Figure 20:
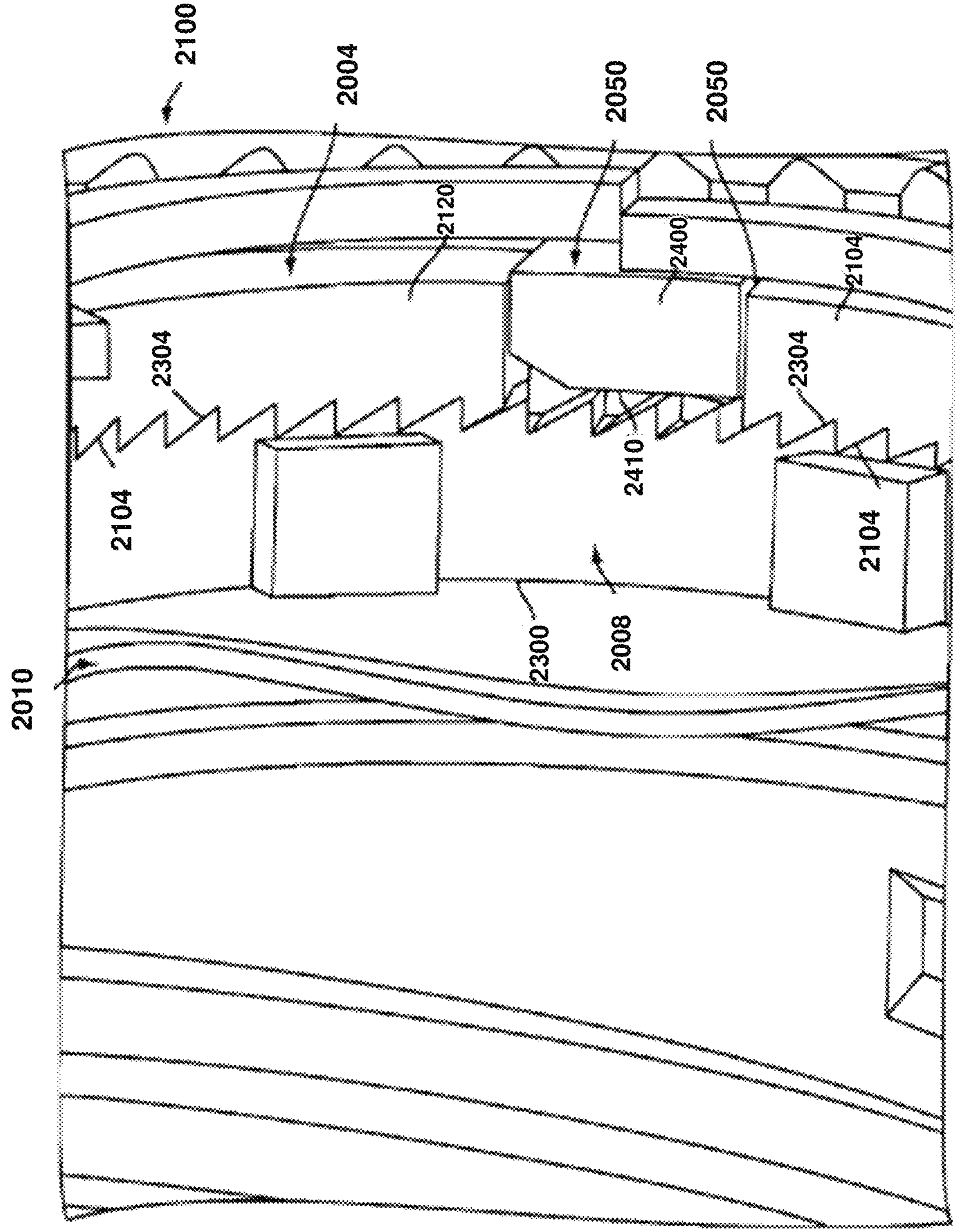
FIG. 20 is an enlarged partial perspective view of the connector coupling of FIG. 18, showing locking members of the ratchet ring engaged with locking members of an inner collar.

As shown in FIG. 20, with the ratchet ring in the engaged position, the locking members 2104 of the inner collar 2004 and the locking members 2304 of the ratchet ring 2008 are engaged with one another. In such embodiments, the inner collar 2004 may rotate in the mating direction via a ratcheting action but may not rotate in the opposite, unmating direction. In some embodiments, the biasing member 2010 may act to push the ratchet ring 2008 towards the locking members 2104 of the inner collar 2004, with the ratchet ring grinding with teeth of the inner collar. As shown in FIG. 20, the projections 2400 of the actuating ring 2050 may rest in the slots 2130 between the projections 2120 of the inner collar 2004. The abutment surfaces 2410 of each of the actuating ring projections 2400 may abut or be slightly spaced from the locking members 2304 of the ratchet ring 2008. In some embodiments, tabs 2032 (see FIGS. 7 and 17) may be provided extending from the body's flange 2030 which interface with a shoulder on the inside of the inner collar 2004. In some embodiments, the tabs 2032 may help to prevent the spring 2010 from being over compressed.

Figure 19:
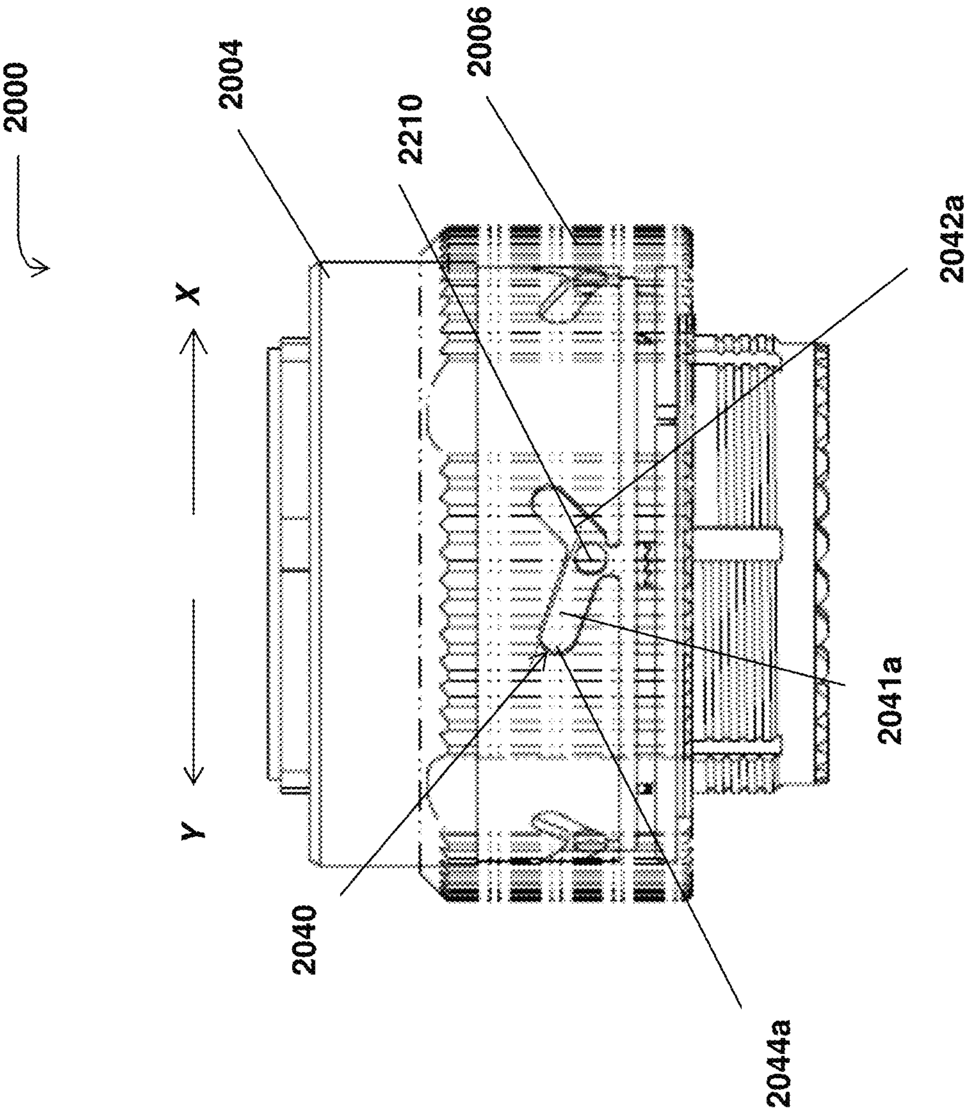
FIG. 19 is a top view of a connector coupling of FIG. 18.

With the ratchet ring in the engaged position, the outer collar 2006 may be oriented relative to the inner collar 2004, with bayonet pins 2210 extending inwardly from the outer collar 2006 to rest in a home position of the corresponding bayonet channels 2040 disposed in the outer surface of the inner collar 2004. As shown in FIG. 19, the home position may be adjacent an open end of each of the mating **2042*a* and unmating 2041*a*** paths of the bayonet channel.

Figure 21:
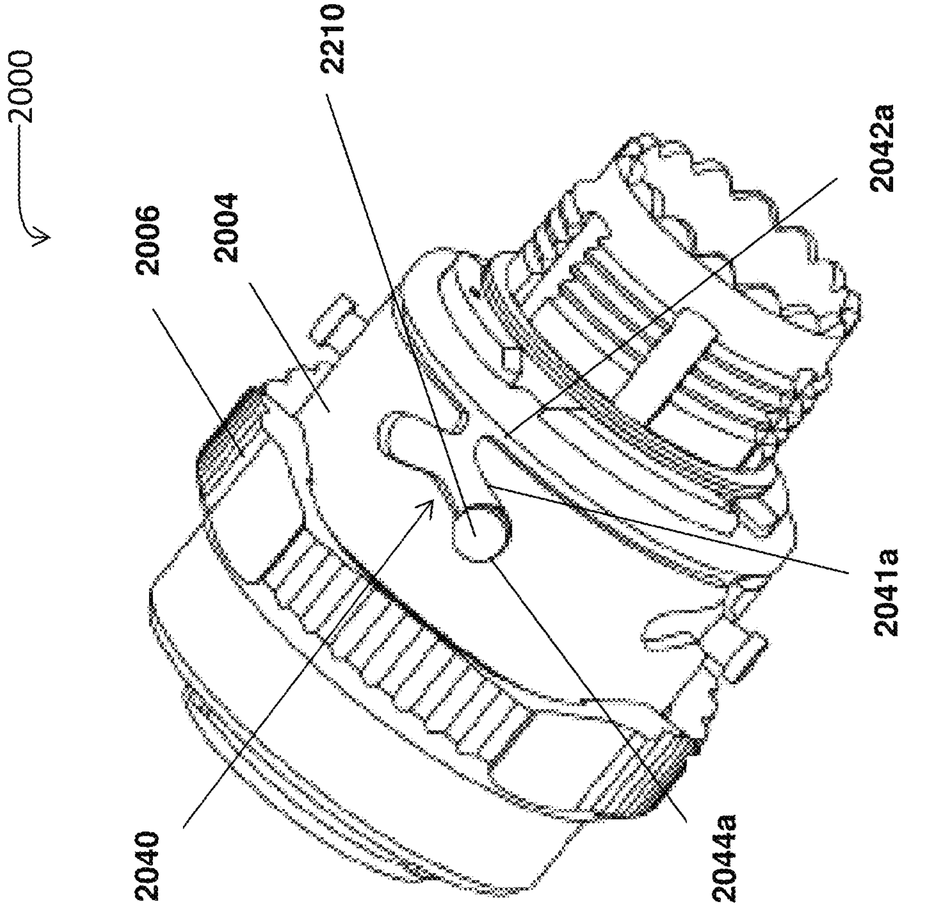
FIG. 21 is a perspective view of the connector coupling of FIG. 18 moved in an unmating direction, with a portion of an outer collar shown cut away.
Figure 23:
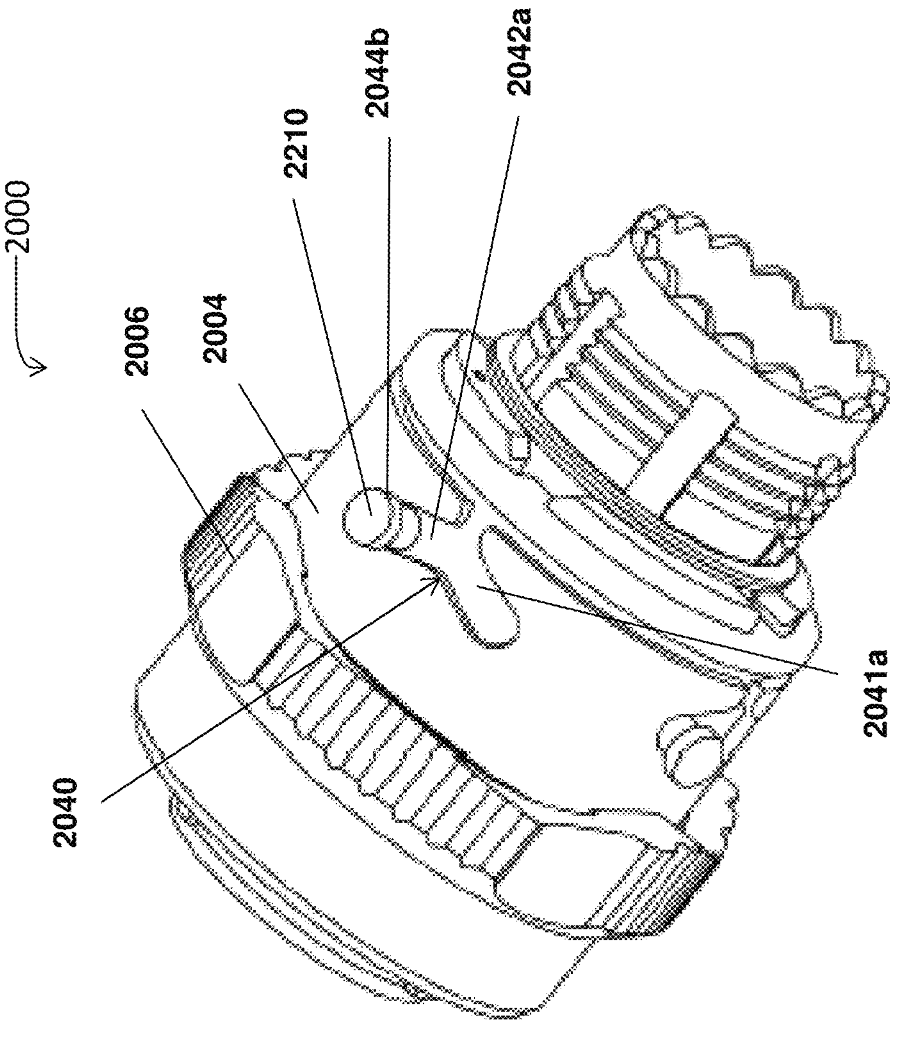
FIG. 23 is a perspective view of the connector coupling of FIG. 18 moved in a mating direction, with a portion of an outer collar shown cut away.

According to some embodiments, once the ratchet ring is in the engaged position, movement of the connector coupling in the mating and/or unmating directions may purposefully disengage the locking members of the inner collar and the ratchet ring. In some embodiments, moving the connector coupling in the mating and/or unmating direction may include moving the outer collar in the mating and/or unmating direction (relative to the inner collar). FIGS. 21 and 23 illustrate movement of the connector coupling in the unmating and mating directions, respectively, with the bayonet pin shown in the corresponding unmating and mating paths.

As illustrated in FIG. 21, the connectors may be unmated by rotating the outer collar 2006 in the unmating direction (see the arrow labeled Yin FIG. 19). As shown in FIG. 19, the unmating direction is opposite to the mating direction (see the arrow labeled X in FIG. 19). In such embodiments, the outer collar 2006 may rotate in the unmating direction relative to the inner collar 2004 such that the bayonet pins 2210 of the outer collar 2006 move up the ramp of the first unmating path **2041*a* of the bayonet channel 2040 while the locking members are disengaged. In some embodiments, as shown in FIG. 21, the outer collar may be moved in the unmating direction until the pin 2210 is received in a closed end 2044*a* of the unmating channel 2041*a***. As will be appreciated, in some embodiments, the bayonet pin need not travel the entire length of the unmating path to disengage the locking members.

Figure 22:
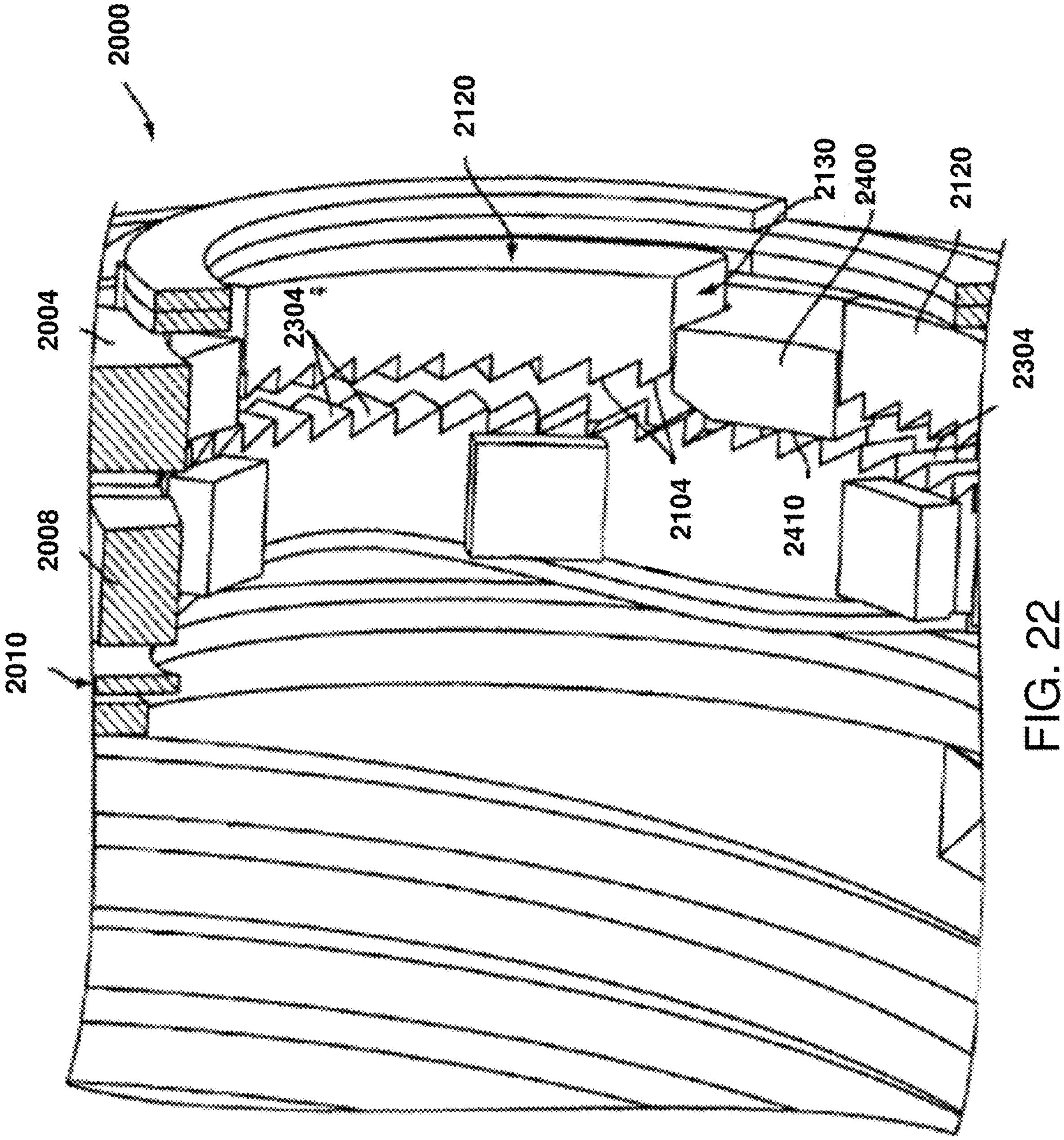
FIG. 22 is an enlarged partial perspective view of the connector coupling of FIG. 21, showing a ratchet ring in the disengaged position.

In some embodiments, rotating the outer collar 2006 in the unmating direction may advance the outer collar 2006 and the actuating ring 2050 received therein toward the ratchet ring 2008 and against the bias of the biasing member 2010. In such embodiments, the projections 2400 of the actuating ring 2050 may move toward the ratchet ring 2008 such that the projection abutment surfaces 2410 push the locking members 2304 and the ratchet ring 2008 away from the locking members 2104 of the inner collar 2004 (see FIG. 22). In some embodiments, with the locking members 2104 and 2304 spaced and disengaged from each other, the inner collar 1004 may be rotated in a release direction to unmate the connectors.

In some embodiments, the ratchet ring 2008 may be moved in an axial direction, against the biasing member, as the coupling is moved in the unmating direction and the locking members are moved between the engaged and disengaged positions. The ratchet ring also may move in other suitable directions during disengagement of the locking members. For example, the ratchet ring may be moved in a radial direction. The ratchet ring also may be rotatable when the locking members are moved between the engaged and disengaged positions.

Although the connector coupling is described as being unmated when the connector coupling is moved in the unmating direction, disengaging the locking members, in some embodiments, the connector coupling may be arranged only for engagement. In such embodiments, the connector coupling may be arranged to only move in the mating direction. In such embodiments, the connector coupling may not include an unmating path along which the bayonet pin may travel. In such embodiments, disengagement of the locking members may occur only when the connector coupling is moved in the mating direction.

FIG. 23 illustrates an example in which the connector coupling is moved in the mating direction (see the arrow labeled X in FIG. 19), causing the ratchet ring to be disengaged from the inner collar. In some embodiments, as shown in FIG. 23, the outer collar 2006 is rotatable relative to the inner collar in the mating direction to move the bayonet pin 2210 up the ramp of the mating path 2042*a* of the bayonet channel. In some embodiments, as shown in FIG. 23, the bayonet pin may travel all the way to a closed end 2044*b* of the mating path. The bayonet pin need not travel the entire length of the mating channel, though, to disengage the locking members of the inner collar and the ratchet ring. For example, in some embodiments, the bayonet pin may travel only part way up the ramp of the mating path. In some embodiments, the bayonet pin may travel a length of the ramp that corresponds to a height of the locking members.

As with the above, rotating the connector coupling in the mating direction may cause the ratchet ring 2008 to be moveable against the bias of the spring such that the locking members 2104 and 2304 can be spaced and moved away from each other. This, in turn, may allow the outer collar to rotate to disengage its locking members from the locking members of ratchet ring. In some embodiments, this may make it easier to couple the mating connection, without the added friction of ratcheting. In some embodiments, the ratchet ring may be moveable in an axial direction, although the ratchet ring may be moveable in a radial, rotational, or other direction during disengagement of the locking members.

In some embodiments, travel up the ramp of the mating path and disengagement of the locking members may correspond to an input torque required to fully mate the connectors. For example, the ramp may be angled such that the distance travelled by the pin (and rotation of the coupling connector) allows the input torque to reach or exceed the level needed for full mate bottoming. In some examples, this ramp angle may correspond to an input torque of between about 8 in/lb to about 10 in/lb. In such embodiments, once the bayonet pin has traveled the prescribed distance, the locking members of the inner collar are disengaged from the locking members of the ratchet ring (e.g., the teeth move away from each other). In such embodiments, the user may thereafter release the outer collar such that the bayonet pin may return to the home position (see FIG. 18), with the locking members again in the engaged position.

As shown in FIG. 19, the mating and unmating paths of the bayonet channel may be asymmetrical in some embodiments. For example, in some embodiments, a path angle of the mating path may be different than a path angle of the unmating path. In such embodiments, the differing angles may correspond to a difference in input torque required to disengage the locking members when the connectors are being mated (e.g., the connector coupling is moved in the mating direction) and unmated (e.g., when the connector coupling is moved in the unmating direction). In some embodiments, the angle of the mating path also may be set such that the bayonet pin returns to a home position after the pin is moved in the mating direction. In such embodiments, the mating path may be arranged such that the teeth become engaged after mating is accomplished.

In some embodiments, the path angle for each path may be between about 0 and 90°. In such embodiments, a path angle of the second mating path 2042*a* may be about 45°, while a path angle of the unmating path 2041*a* may be about 70°. A length of the first path also may differ from a length of the second path in some embodiments. In still another embodiment, a curvature of the first path may differ from that of the second path. As will be appreciated, in some embodiments, both paths may be substantially straight.

In some embodiments, the mating and unmating paths also may be symmetrical. For example, in such embodiments, the path angle of the first path may be the same as the path angle of the second path.

Figure 25:
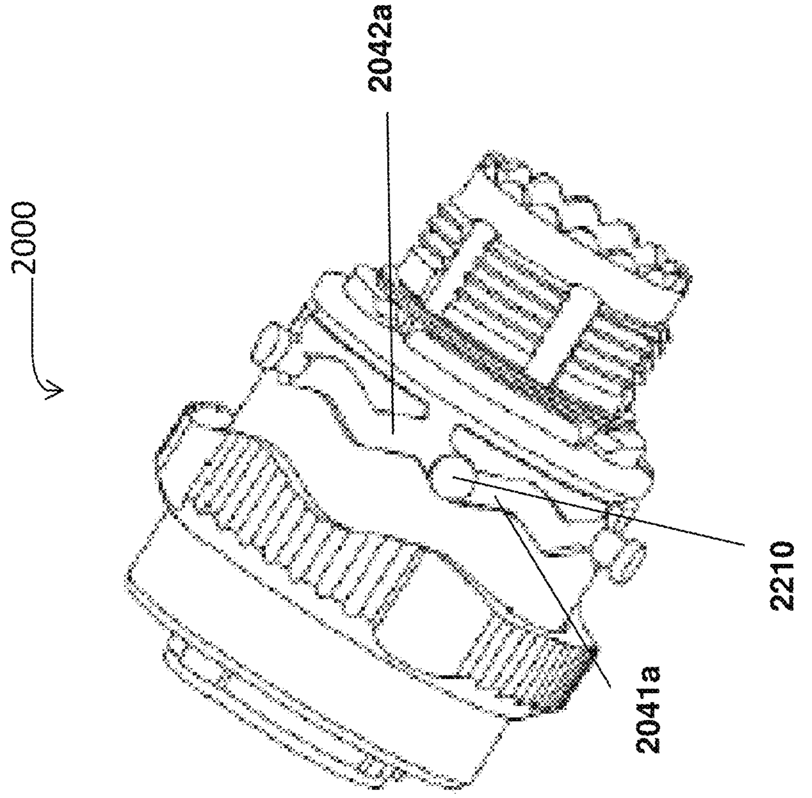
FIG. 25 shows the connector coupling of FIG. 24 moved in an unmating direction.
Figure 24:
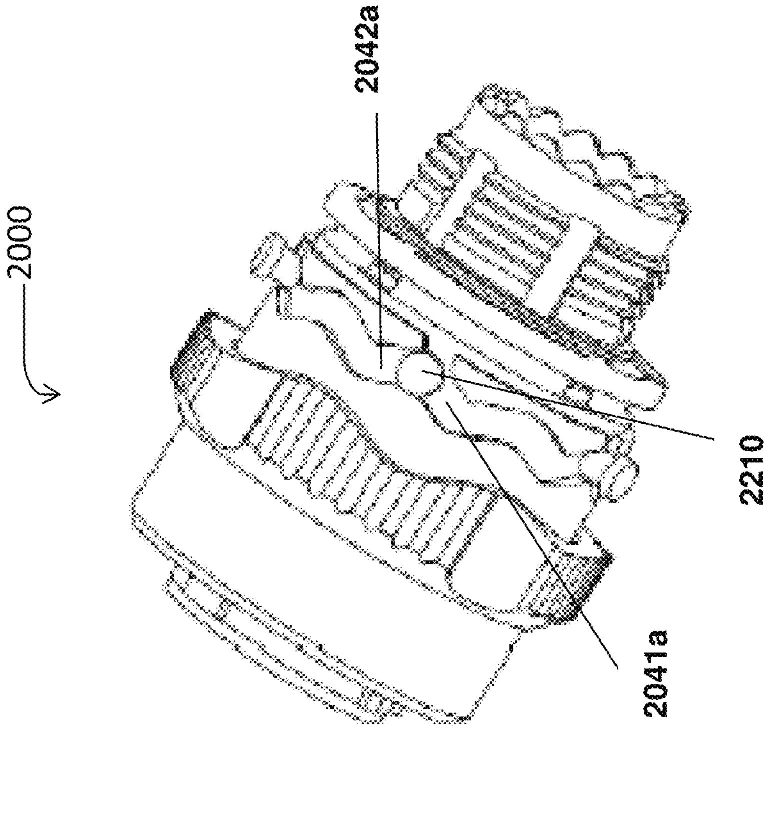
FIG. 24 is a perspective view of a connector coupling with an outer collar shown cut away, a ratchet ring of the connector coupling being in an engaged position and a bayonet pin being in a first home position.

As shown in FIG. 21, the inner collar may include multiple bayonet channels formed around its circumference, with each channel having mating and unmating paths and corresponding closed ends. In other embodiments, as illustrated in FIGS. 24-25, the inner collar may instead have a single continuous bayonet channel that extends around the circumference of the inner collar. In such embodiments, as shown in these views, for example, the bayonet channel may have a plurality of mating and unmating paths that are connected to one another.

Figure 27:
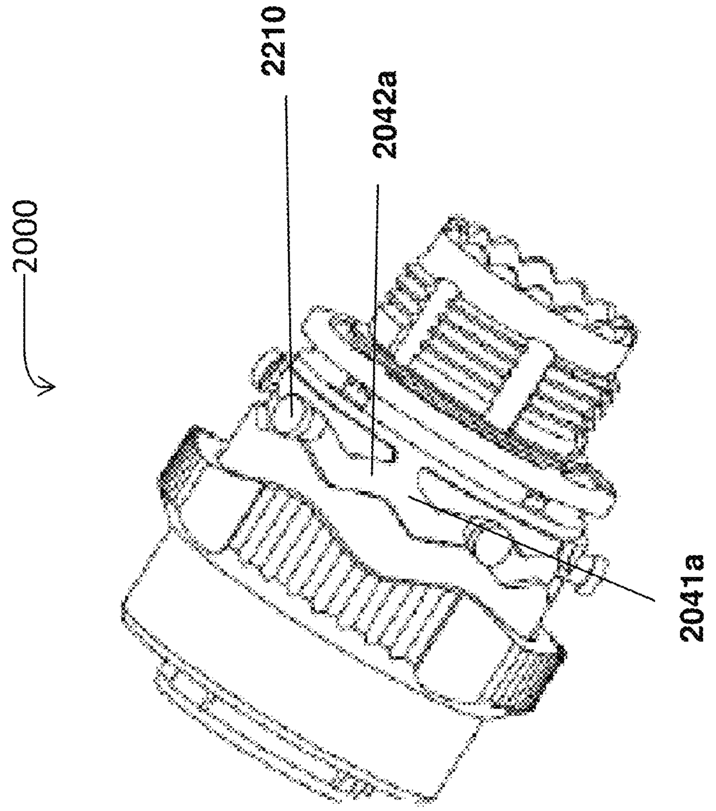
FIG. 27 shows the connector coupling of FIG. 24, with a bayonet pin shown in a second home position.
Figure 26:
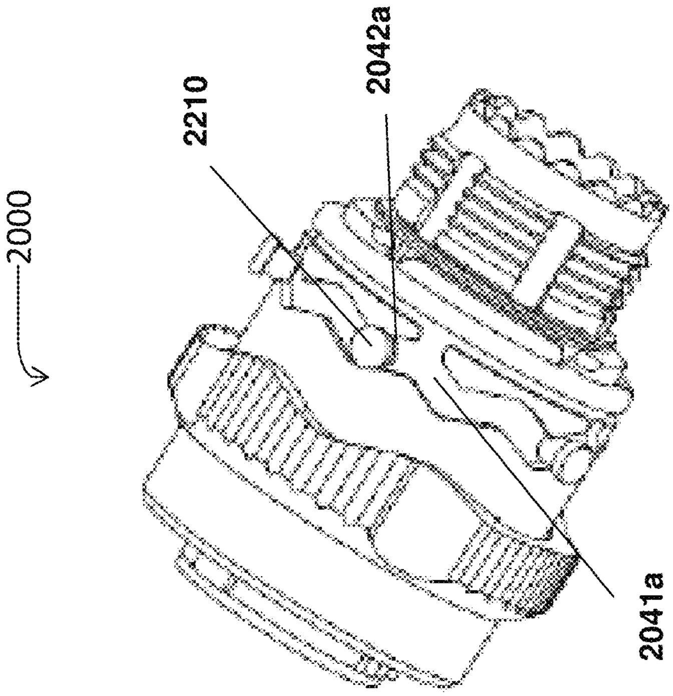
FIG. 26 shows the connector coupling of FIG. 24 moved in a mating direction.

FIG. 24 illustrates an example in which the bayonet pin 2201 is in a home position and the locking members of the inner collar and ratchet ring are in an engaged position. As shown in FIG. 25, when the connector coupling is rotated in an unmating direction, the bayonet pin may travel up the ramp of the unmating path, with the locking members separating to allow the connectors to be unmated. FIG. 26 illustrates the connector coupling being moved in the mating direction, up the ramp of the mating path. In some embodiments, once the locking members have been disengaged and the connectors have been fully bottomed, the pin may travel up and over the ramp of the mating path and to the adjacent unmating path (see FIG. 27). In such embodiments, instead of returning (e.g., snapping back) to the same home position (see, e.g., FIGS. 18 and 19 where there are multiple separate bayonet channels), the bayonet pin may move to an adjacent home position when the locking members of the inner collar and ratchet ring are again engaged.

In some embodiments, the mating path may be tuned to input torque such that the user may get a tactile or audible feedback from overcoming the ramp and moving to the second home position.

In some embodiments, the user may continue to turn the connector coupling in the mating direction such that the bayonet pin travels up the ramp of another mating path, into the next unmating path, and then to the next home position. In such embodiments, the locking members on the inner collar and ratchet ring may be disengaged (e.g., during travel up the mating path of the bayonet channel), and thereafter engaged once the bayonet pin returns to the home position. Such movement may not necessarily result in any threading or coupling between the connectors. As will be appreciated, once the connectors have been fully bottomed, such as during a first turn of the connector coupling in the mating direction, the connectors are not further coupleable, even though the connector coupling is moved again in the mating direction. However, such additional rotation in the mating direction may serve as a confirmation of the coupling (e.g., by the user or by a second, supervising user). In embodiments in which the connectors are not properly bottomed during the first turn, the second turn of the connector coupling in the mating direction could result in additional threading of the connector couplings, such as to achieve full bottoming.

Although the bayonet channels are shown on an outside surface of the inner collar, it will be appreciated that the channels may be located in other suitable portions of the inner collar. For example, in some embodiments, one or more channels may be formed in an inner surface of the inner collar for receiving corresponding bayonet pins. In other embodiments, the bayonet channels may be formed between the inner and outer surfaces. For example, the bayonet channels may be formed on a surface perpendicular to the shown radial surface. The bayonet channels also may be formed at another angle relative to the shown radial surface. In such examples, the bayonet channels may be formed all the way between the inner and outer surfaces. The bayonet channels also may be formed at least partially between the inner and outer surfaces.

In still another embodiment, the one or more bayonet channels may be formed on the outer collar, with the inner collar having corresponding bayonet pins arranged to move within the bayonet channel(s). In such embodiments, the outer collar may include a plurality of bayonet channels, each channel having mating and unmating paths. The outer collar also may include a single, continuous channel.

Figure 30:
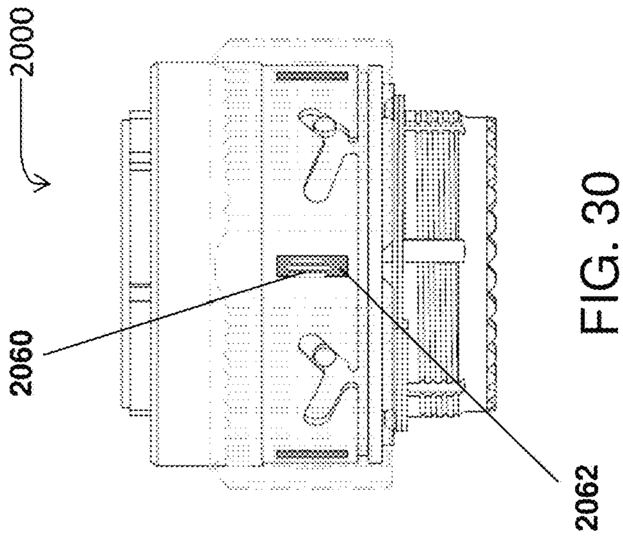
FIGS. 28-30 illustrate indication of a mating process of a plug and receptacle via an indicator according to some embodiments, with FIG. 28 showing no indicia before mating begins, FIG. 29 showing some indicia to indicate a beginning of the mating process, and FIG. 30 showing full indicia to indicate full bottoming of the plug and receptacle.
Figure 29:
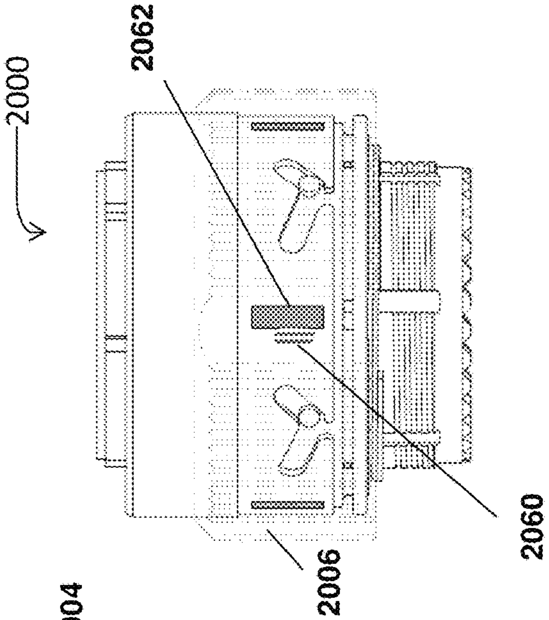
Figure 28:
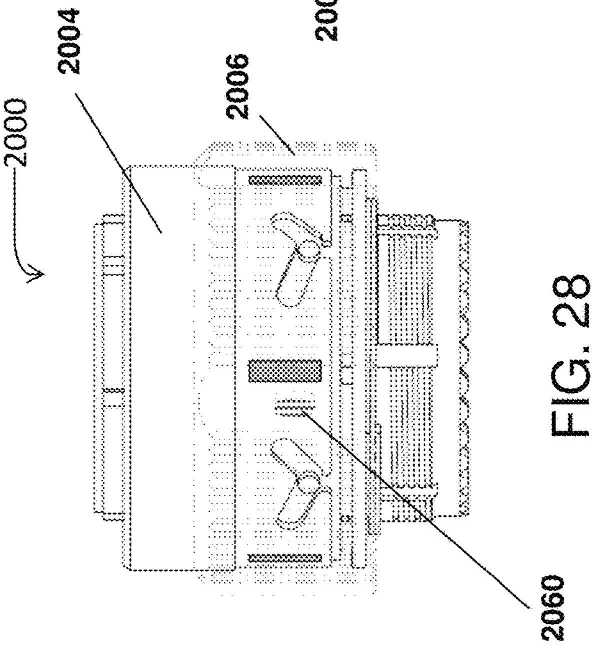

In some embodiments, the connector coupling may include an indicator to indicate the mating status of the plug and receptacle connectors. FIGS. 28-30 illustrate an example in which an indicator provides a visual indication to the user. In such embodiments, the inner collar 2004 may include a bar printed with indicia. For example, the bar may be painted with a green colored pattern 2060. It will be appreciated that the bar may be printed with other colors or indicia in other embodiments. In some embodiments, the outer collar 2006 may include a cutout 2062 through which the bar is visible to the user. In such embodiments, as the user rotates the coupling in the mating direction (e.g., a clockwise direction), the green bar may become visible as the bayonet pin travels along the mating path of the bayonet channel. For example, as shown in FIG. 29, the indicator 2062 may display no mark when the bayonet pin has not yet entered the mating path or is at the beginning of the mating path. The indicia (e.g., the green mark) may start to be visible, as shown in FIG. 30, when mating between the connectors begins. Finally, as shown in FIG. 30, the indicia (e.g., the green mark 2060) may be fully visible through the collar cutout when an input torque equal to or greater than the torque needed to fully bottom the plug to the receptacle connectors is achieved. In some embodiments, when the user releases the outer collar after full bottom is achieved (e.g., after disengagement of the locking members) and the bayonet pin is returned to the home position, the indicia may disappear.

In another embodiment, the indicator may produce an audible and/or tactile response for the user. For example, in such embodiments, a bump and/or audible click may occur when the mating process begins and/or when full mating has been achieved. As with the above, the audible and/or tactile response may occur when the input torque is equal to or greater than the torque needed to fully bottom the plug to the receptacle. In some embodiments, the audible and/or tactile response may vary depending upon the stage of mating. For example, in some embodiments, the indicator may provide a single bump or click at the end of each mating. In another example, the indicator may provide a single bump and/or click at the beginning of mating and a double click when full bottoming has been achieved. In other embodiments, the indicator may be arranged to keep clicking if the user turns the connector to indicate full bottoming between the receptacle and plug.

In embodiments where a continuous ramp is used, the indicia may be displayed (and/or felt or heard) when the pin is moved out of the first home position and into a second, adjacent home position. In such an example, the pin may move into the second home position after the input torque is equal to or greater than the torque need to fully bottom mate the connector. As with the above, different types of indicia may be used when indicating the start of the mating process and full bottoming between the receptacle and plug.

Although the indicator is shown and described as having a visual or an audible and/or tactile indicia, in other embodiments, the indicator may both display a visual indicia and produce an audible and/or tactile response to be heard and/or felt by the user.

As shown in FIG. 20, for example, the locking mechanism may be arranged to remain in an engaged position, except for when the user is purposefully disengaging the locking members for mating or unmating of the connector. For example, in some embodiments, the locking teeth on the ratchet ring are arranged to remain engaged with the locking teeth on the inner collar, except for when the teeth are disengaged during mating or when the connector coupling is being unmated (e.g., unlocked).

Figure 31:
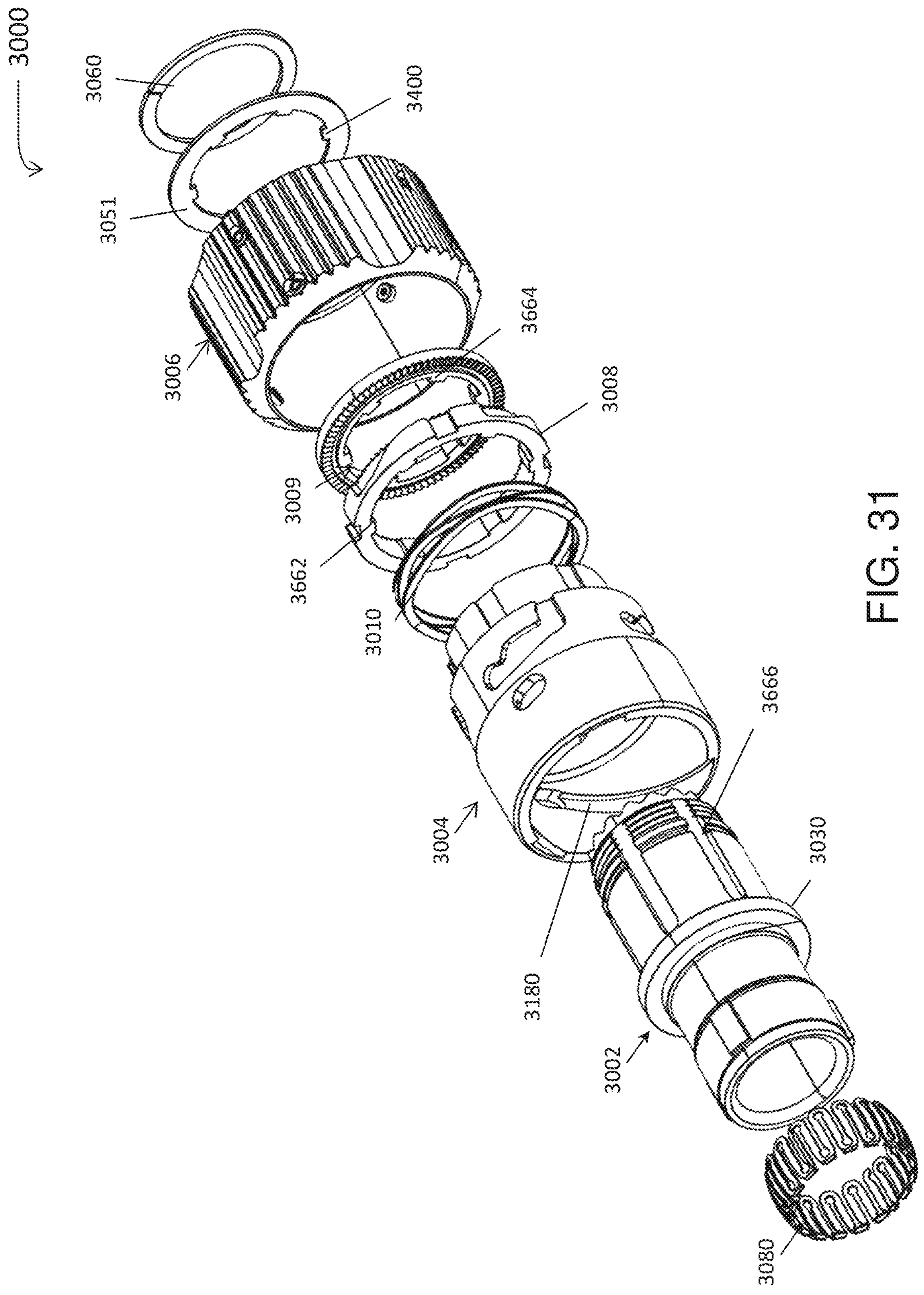
FIG. 31 is an exploded perspective view of a connector coupling according to other embodiments of the present disclosure.

The locking mechanism also may be arranged to remain disengaged until full mating of the connectors in some embodiments. As shown in FIG. 31, the connector coupling may include an inner collar 3004, an outer collar 3006, a locking mechanism and a biasing member 3010. In some embodiment, as shown in this view, the locking mechanism may include first and second ratchet rings 3008, 3009 with corresponding locking teeth. In some embodiments, the first ratchet ring engages with the outer collar. In some embodiments, the biasing member may include a wave spring. In some embodiments, the wave spring may be arranged to push the first and second ratchet rings toward one another. In such embodiments, the locking teeth of the first and second ratchet rings may be moved toward one another. In some embodiments, the spring may be arranged to push the ratchet teeth of the first ratchet ring in a backward direction.

In some embodiments, the connector coupling may be disposed on a connector body 3002, such as the shell of a plug connector. In some embodiments, the inner collar 3004 may accept the connector body while the outer collar receives the inner collar. In some embodiments, the ratchet rings and biasing member may be disposed between the connector body and the inner and outer collars.

As shown in FIG. 31, the connector coupling may include a grounding band 3080, which, in some embodiments, may be provided between the connector body 3002 and the inner collar 3004. In some embodiments, the grounding band may be used to fill in a gap between metal to metal interference (e.g., an uneven surface) and may serve as an energy storage to reduce movement between the connectors, such as during vibration.

In some embodiments, an outer flange 3030 of the connector body 3002 may create a stop to prevent the inner collar from moving with respect to the connector body. The connector also may include a retaining clip 3060 on the connector body outside of the outer collar. In some embodiments, the retaining clip 3060 may be arranged to retain the inner collar, the outer collar, the ratchet ring, and the biasing member on the connecting body.

Figure 32:
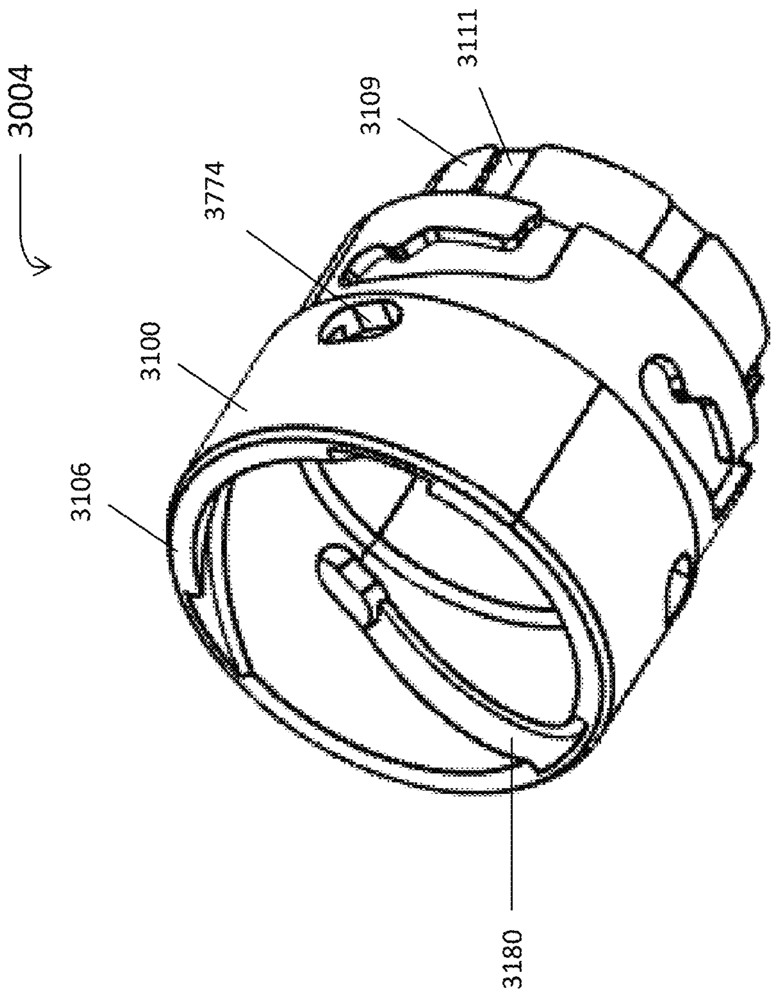
FIG. 32 is a perspective view of an inner collar of the connector coupling of FIG. 31.
Figure 39:
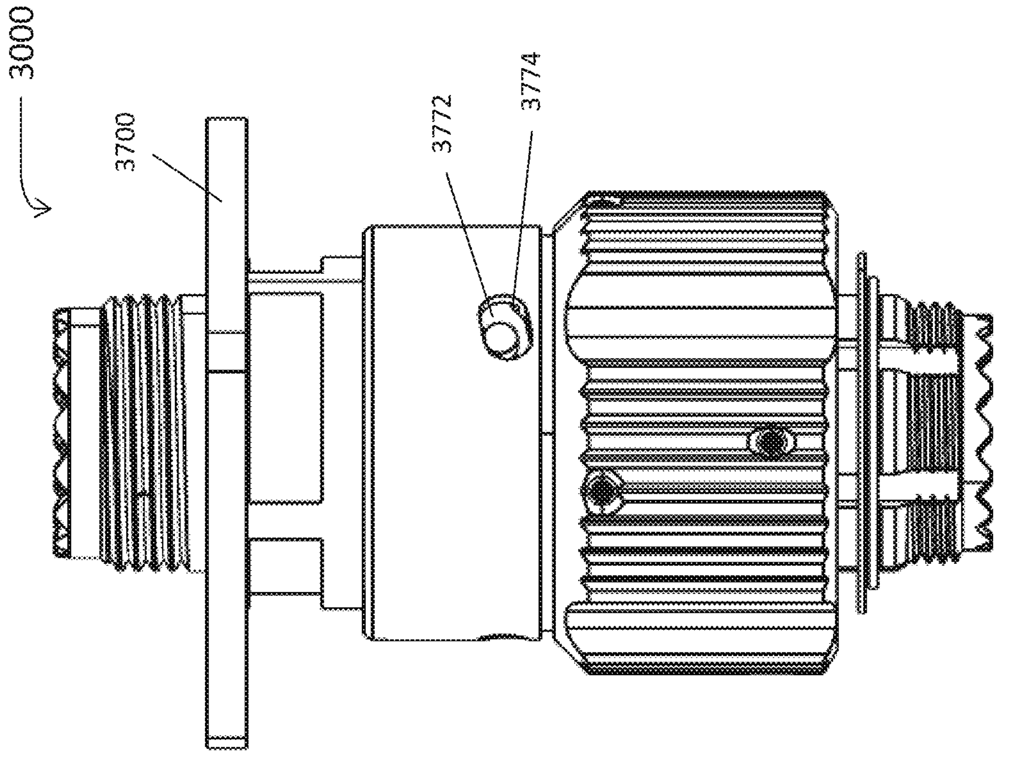
FIG. 39 is a front view of an assembled connector coupling, with the connectors in a fully mated position.

As shown in FIG. 31, the connector coupling may include a retaining washer 3051. In some embodiments, the retaining washer may provide a buffer between the retaining clip and the outer collar (e.g., outer nut/ring). Although the connector coupling is shown as having a retaining washer in FIG. 31, in other embodiments, the connector coupling may be configured without such a retaining washer. In such embodiments, the retaining clip and the outer collar may contact one another As shown in FIG. 32, the inner collar may include a main body 3100 with inner channels for engaging the mating connector. For example, the inner collar may include bayonet channels 3180 formed in the inner surface of the body, the bayonet channels being arranged to engage with corresponding bayonet pins 3772 on the receptacle connector 3700 (see FIG. 39). In such embodiments, the receptacle connector is attachable to the connector coupling by inserting the bayonet pins in the corresponding bayonet channels 3180 and moving the receptacle connector and the connector coupling relative to one another. For example, the inner collar may be rotatable in a mating direction until the bayonet pin reaches the end of the bayonet channel. In some embodiments, the end of the channel includes an opening 3774 into which the bayonet pin is receivable. In some embodiments, the bayonet pin is receivable in the opening when the first and second connectors are full mated. In this regard, the bayonet pin may serve as an indicator of the mating status of the connector coupling.

As will be appreciated, although the inner collar is shown as having inner bayonet channels that engage with corresponding bayonet pins for coupling the connector coupling and the connector, in other embodiments, the inner coupling may include other suitable channels for coupling with pins or other suitable fasteners. In still other embodiments, the inner coupling may include inner threads, similar to the above. In such embodiments, the threads may correspond to threads on the mating connector.

In some embodiments, the body 3100 of the inner collar may include first and second opposite ends 3106, 3109 (see FIG. 32) that define first and second openings through which the connector body 3002 extends. In some embodiments, the second end 3109 may be arranged to engage the outer collar 3006 via an engagement mechanism that allows the outer collar to rotate with respect to the inner collar. In some embodiments, the second end may include a flange with one or more slots 3111 that engage with the first ratchet ring 3008. In some embodiments, the second ratchet ring 3009 may remain stationary with the plug shell, while the first ratchet ring 3008 rotates with the inner collar. In some embodiments, the outer collar may rotate freely about the plug shell, along with the inner collar, until fully mated. In such embodiments, each of the first and second ratchet rings 3008, 3009 (see FIG. 31) have teeth that engage with one another to create the locking mechanism. In some embodiments, the first ratchet ring may be arranged to abut the wave spring.

In some embodiments, the inner collar 3004 is arranged to rotate with respect to the connector body 3002, such as for mating and unmating the connectors. In some embodiments, an outer flange 3030 on the connector body 3002 (see FIG. 31) may serve as a stop to minimize or even prevent the inner collar 3004 from moving relative to the connector body. For example, the outer flange may prevent the collar from moving axially forwards with respect to the connector body 3002.

Figure 40:
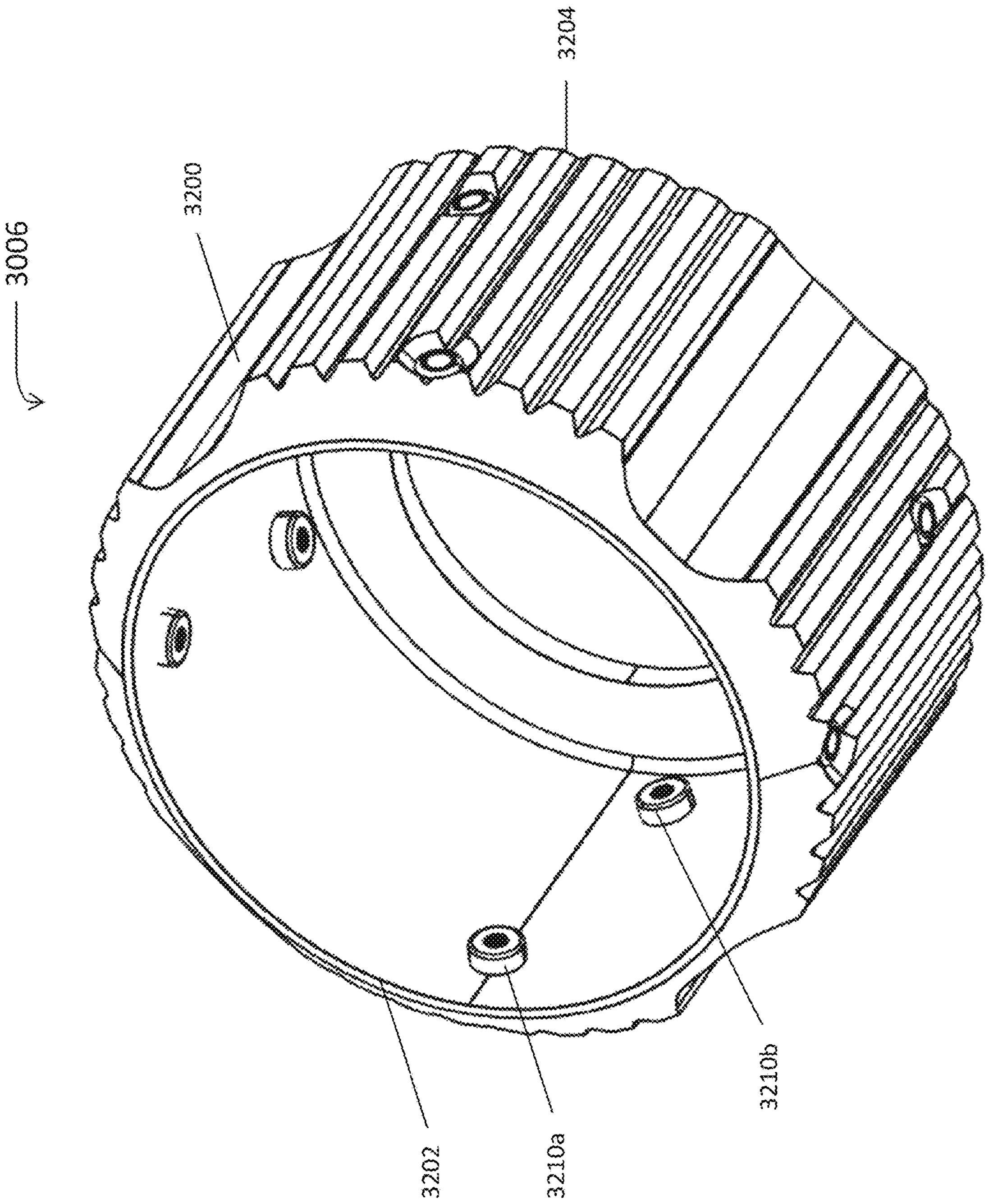
FIG. 40 is a perspective view of an outer collar of the connector coupling of FIG. 31.

FIGS. 31 and 40 illustrate the outer collar 3006 according some embodiments. As seen in these views, the outer collar 3006 may include a body 3200 with opposite first and second ends 3202, 3204 that define respective first and second openings The body 3200 of the outer collar may include an outer gripping surface 3212 (see FIG. 40), in some embodiments, which may facilitate rotational movement of the outer collar relative to the inner collar.

In some embodiments, as shown in FIG. 40, one or more bayonet pins may extend inwardly from the inner surface of the outer collar. In some embodiments, the bayonet pins extend radially inwardly from the inner surface of the outer collar. In some embodiments, a first set of bayonet pins **3210*a* is arranged to cooperate with bayonet channels 3040 of the inner collar (see FIG. 33) and a second set of bayonet pins 3210*b* is arranged to cooperate with the bayonet channels 3088 of the first ratchet ring 3008 (see FIG. 34**). In some embodiments, the first set of bayonet pins is vertically aligned with the second set of bayonet pins.

As will be appreciated, the shape and size of the bayonet pins may correspond with the shape and size of the respective bayonet channels. In some embodiments, the pins may be substantially circular in cross-sectional shape, although the pins may be rectangular, triangular, square, other polygonal or other suitable shape. In some embodiments, each pin may include a head, which in some embodiments is larger than the channel. In such embodiments, the pin head may prevent the pin from moving out of the channel.

In some embodiments, the bayonet pins may be integrally formed with the outer collar. For example, the bayonet pins and outer collar may be a monolithic structure. In other embodiments, the pins may be removably attachable to the outer collar. In other embodiments, the pins may be separately formed and attachable to the outer collar. For example, the pins may be riveted or otherwise fixedly attached to the outer collar.

Figure 38:
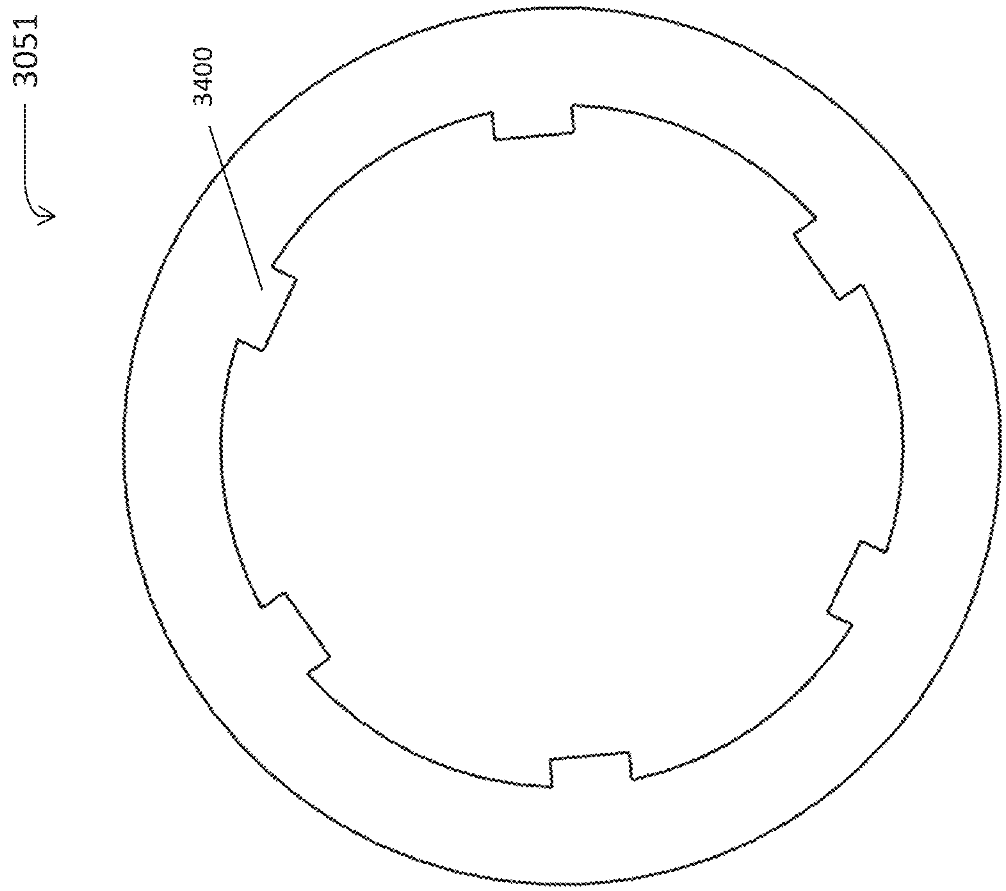
FIG. 38 is a top view of a retaining washer of the connector coupling of FIG. 31.

FIG. 38 shows the retaining washer 3051 may include one or more inner projections 3400. In such embodiments, the projections may extend radially inwardly from an inner surface of the retaining washer. The projections 3400 may be spaced and sized to be received in the slots 3666 formed in the connector body 3002 (see FIGS. 31 and 41).

Figure 34:
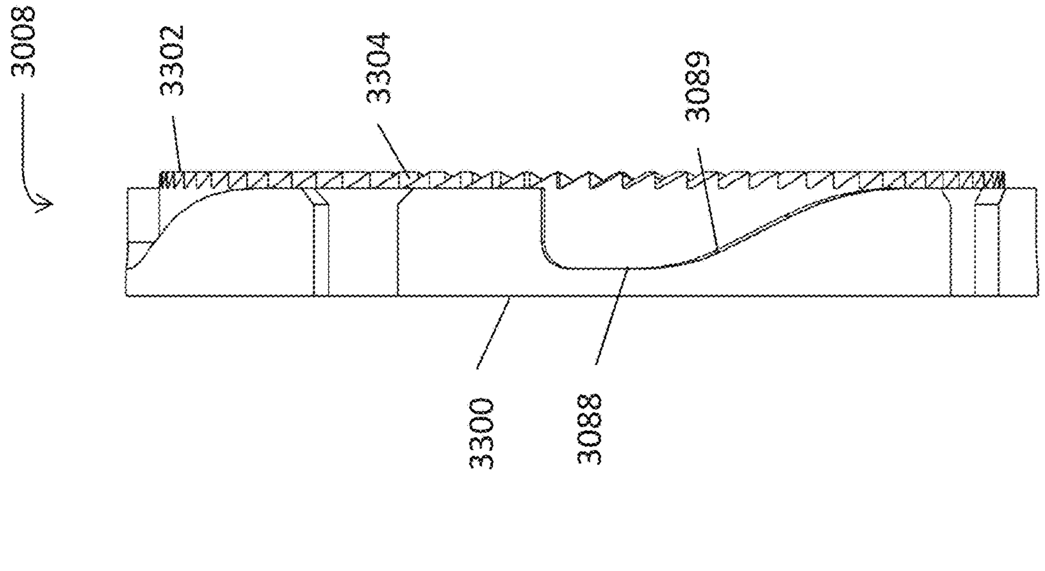
FIG. 34 is a side view of a first ratchet ring of the connector coupling of FIG. 31.
Figure 37:
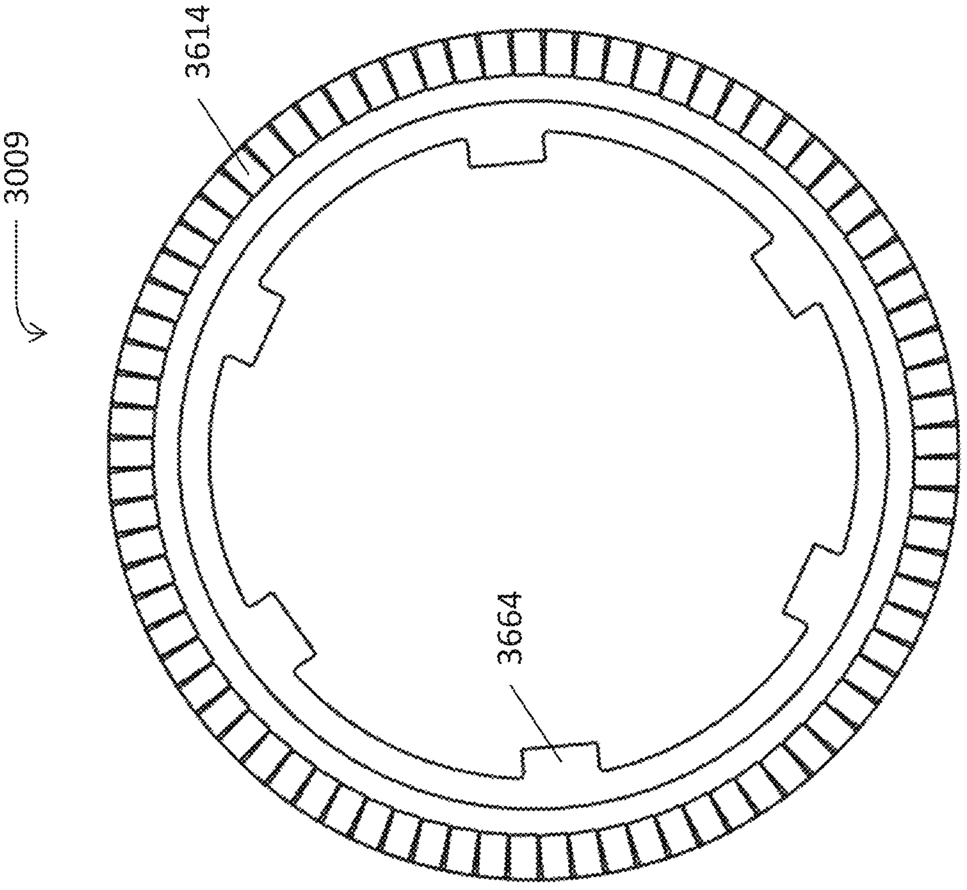
FIG. 37 is a bottom view of the second ratchet ring of FIG. 36.
Figure 36:
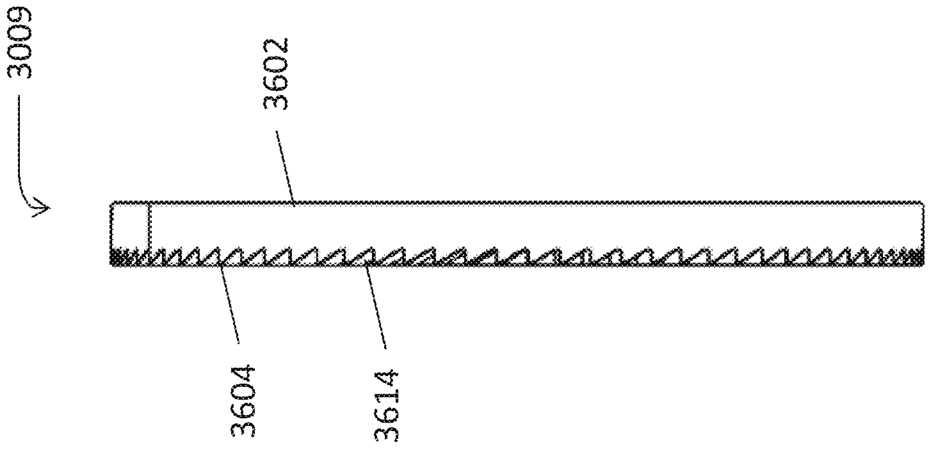
FIG. 36 is a side view of a second ratchet ring of the connector coupling of FIG. 31.

In some embodiments, the first and second ratchet rings include corresponding locking members that engaged with one another to hold the connector coupling in the mated, fully bottomed position. As shown in FIG. 34, the first ratchet ring 3008 may include opposite first and second surfaces. In some embodiments, the first surface 3300 may be generally flat, while the second surface 3302 may include the plurality of locking members 3304 engageable with the locking members 3614 of the second ratchet ring. As with the first ratchet ring, the second ratchet ring may include opposite first and second surfaces. The first surface 3602 of the second ratchet ring may be generally flat while the plurality of locking members 3614 are formed in the second opposite surface 3604. In some embodiments, as shown in these figures, the locking members may include teeth extending from the second surface.

As will be appreciated, the shape and size of the locking members (e.g., teeth) of the first ratchet ring may correspond to the shape and size of the locking members (e.g., teeth) of the second ratchet ring. For example, in some embodiments, the locking members of the first and second ratchet rings may have cooperating angled and flat surfaces to create a one-way ratchet engagement. In some embodiments, the teeth on the ratchet mechanism may have a height of between about 0.01 and about 0.02 inches. For example, the height of the teeth may be about 0.015 inches.

Figure 41:
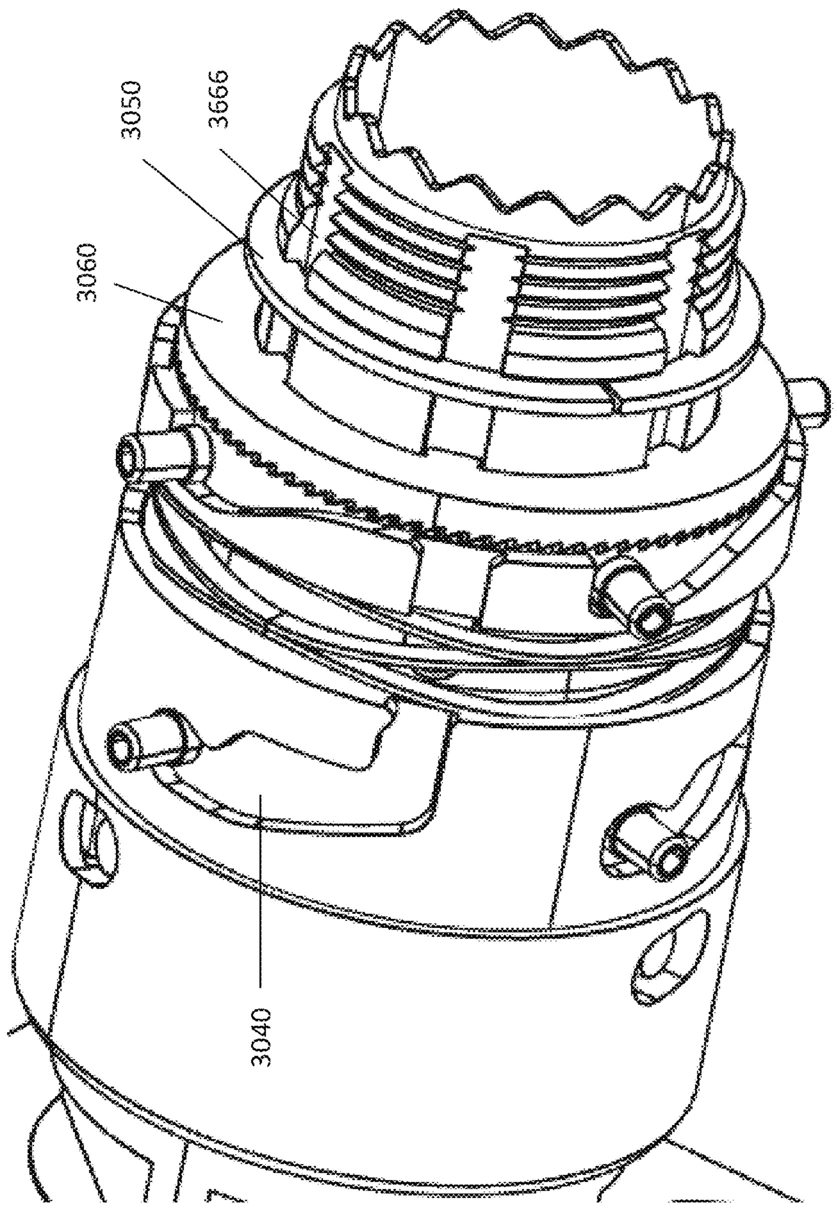
FIG. 41 is a perspective view of an assembled connector coupling with locking members of first and second ratchet rings in an engaged position and an outer collar shown removed.

As shown in FIG. 41, the second surfaces of first and second ratchet rings are arranged to abut one another (e.g., via the engaged teeth) when the connectors are fully mated. In such embodiments, the flat surface of the first ratchet ring is arranged to abut the spring while the flat surface of the second ratchet ring is arranged to abut the outer collar.

Figure 42:
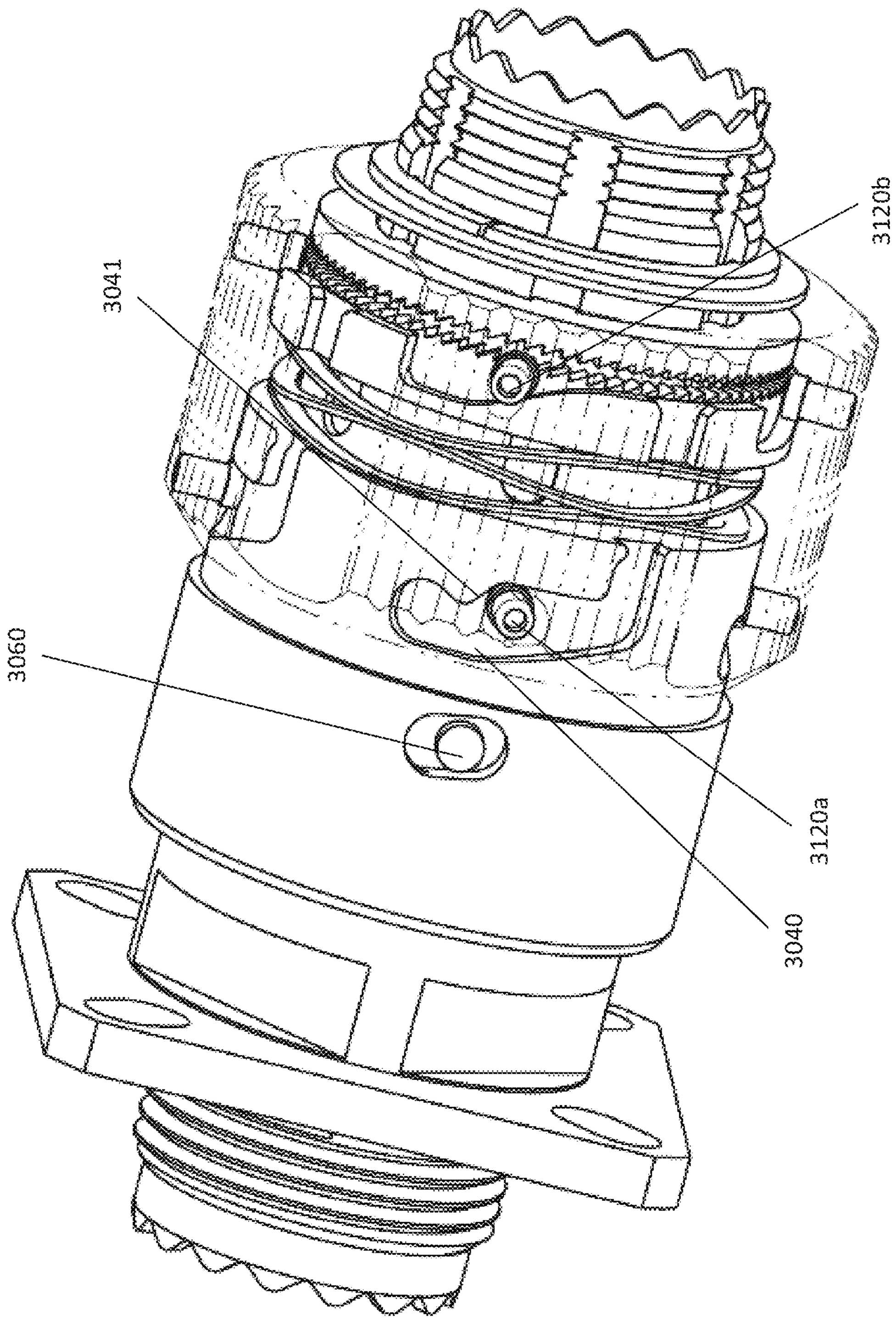
FIG. 42 is an enlarged view of the connector coupling of FIG. 41 with the outer collar shown in transparency and ratchet teeth shown disengaged.
Figure 43:
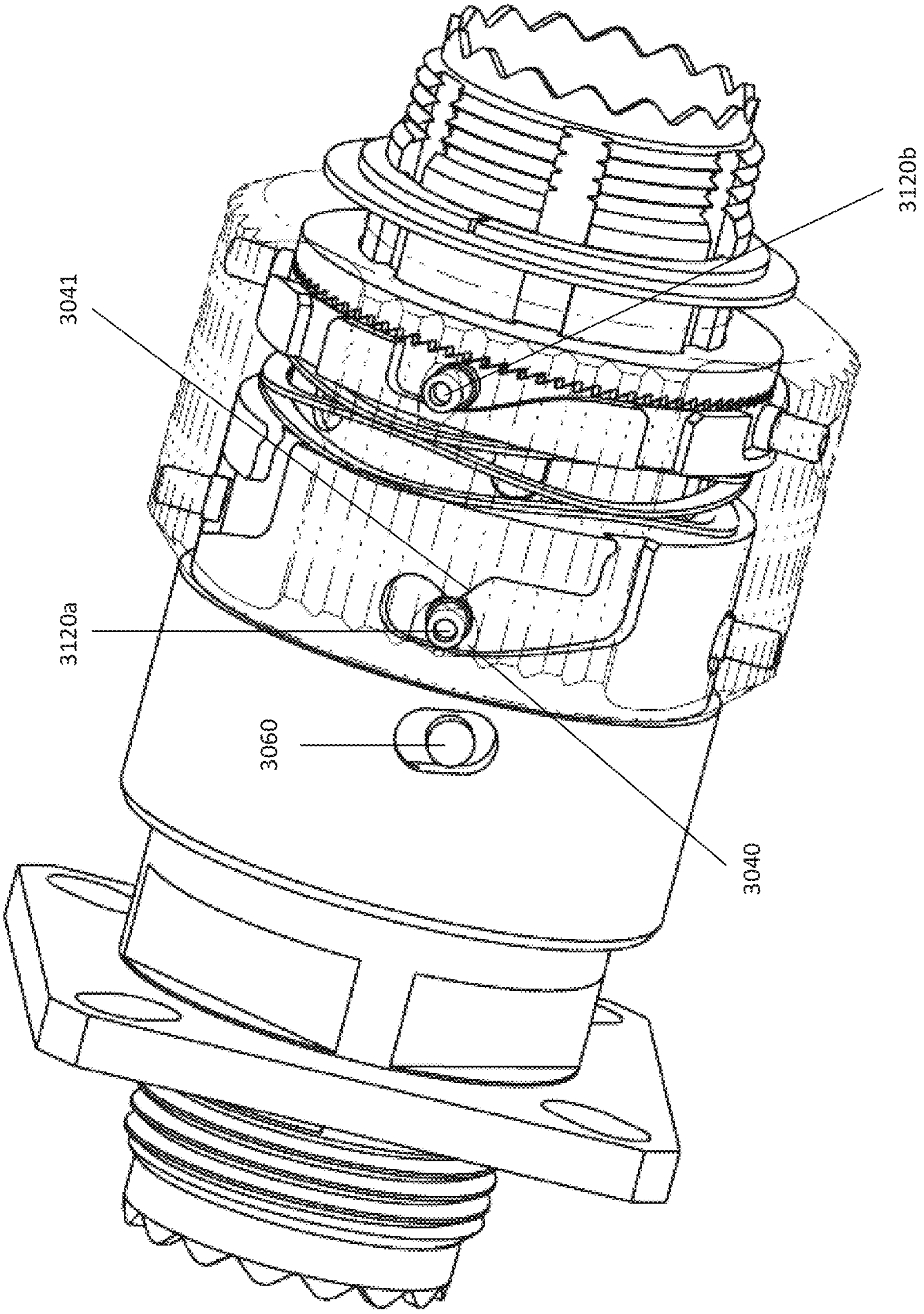
FIG. 43 shows the connector coupling of FIG. 42 during mating of the connector.
Figure 44:
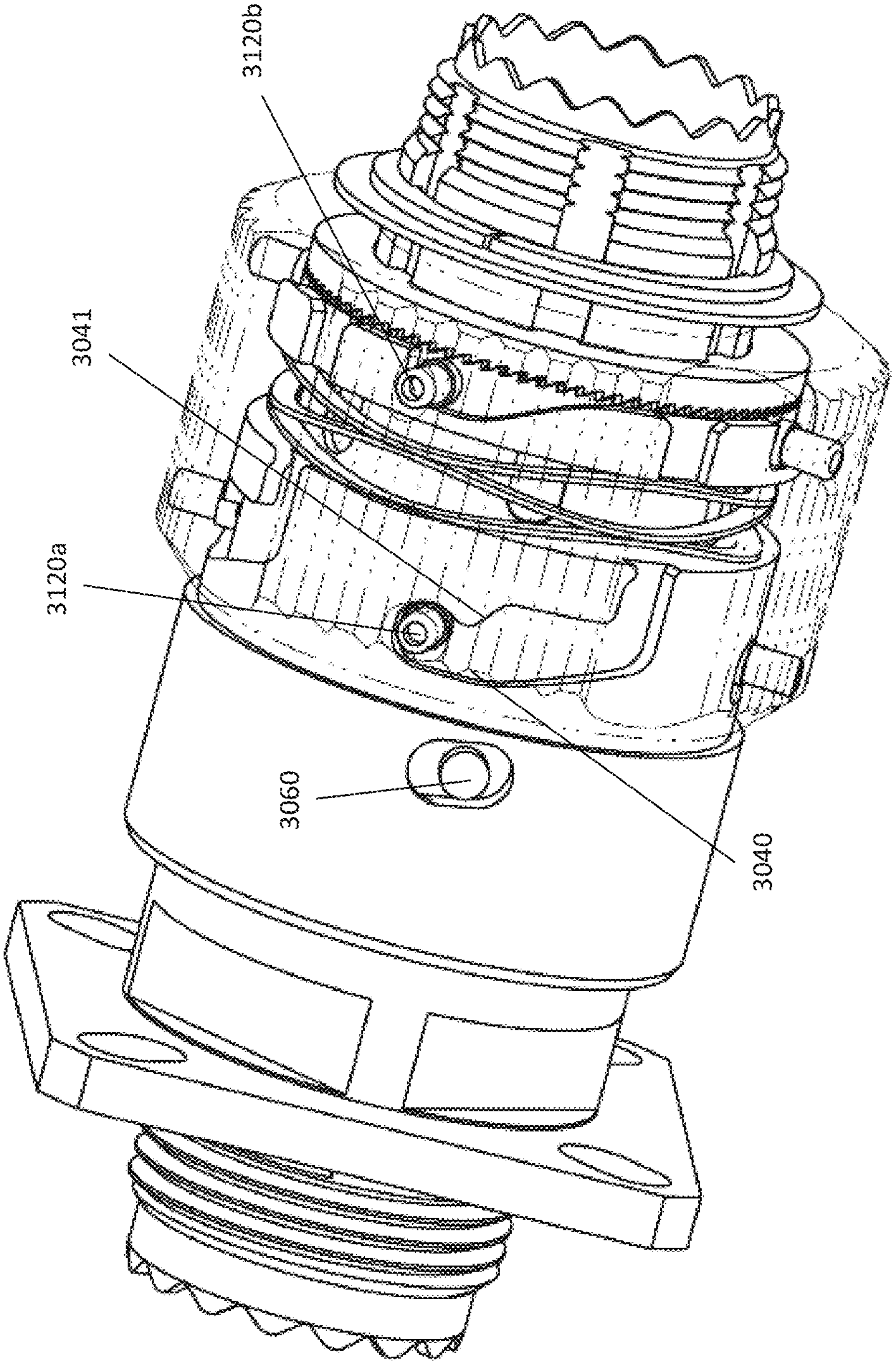
FIG. 44 shows the connector coupling of FIG. 42 with the ratchet teeth fully engaged.
Figure 45:
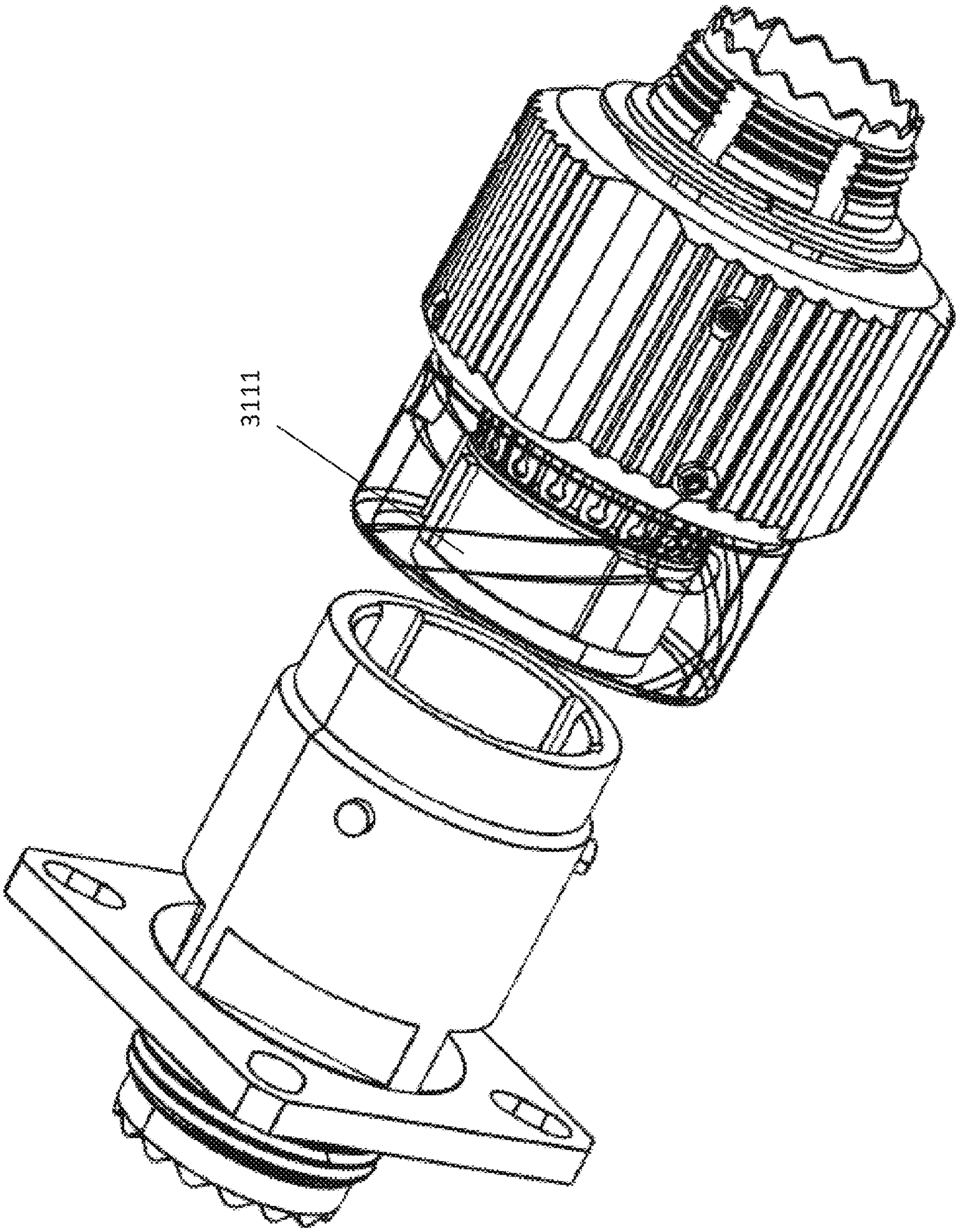
FIG. 45 shows a connector coupling in an unmated position.
Figure 46:
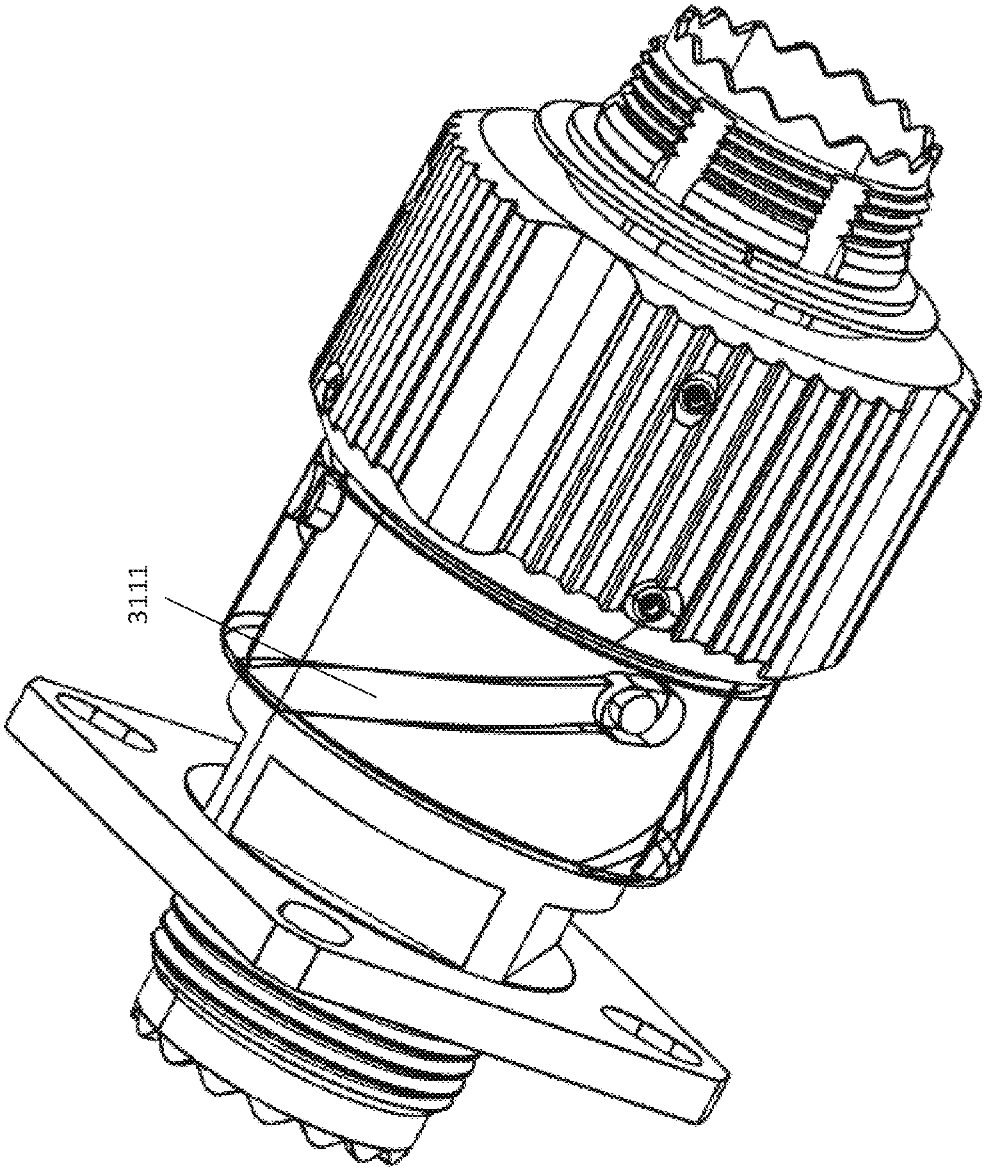
FIG. 46 shows the connector coupling of FIG. 45 in the mated position.

As described, the outer collar includes multiple bayonet pins engageable with the first ratchet ring to mate the coupling connector. The outer collar also may engage with the inner collar. FIGS. 42-44 illustrate movement of the bayonet pins during connector mating, when the outer collar is moved in the mating direction and during.

As shown in FIG. 42, the locking members may remain disengaged (e.g., separated from each other) until the full engagement and mating of the connectors. In these embodiments, the teeth may be moved towards one another yet remain disengaged when the outer collar is rotated towards one another. As will be appreciated, such rotation also may drive bayonet pins 3772 in the respective bayonet channel and toward opening 3774 (see FIG. 39).

Figure 33:
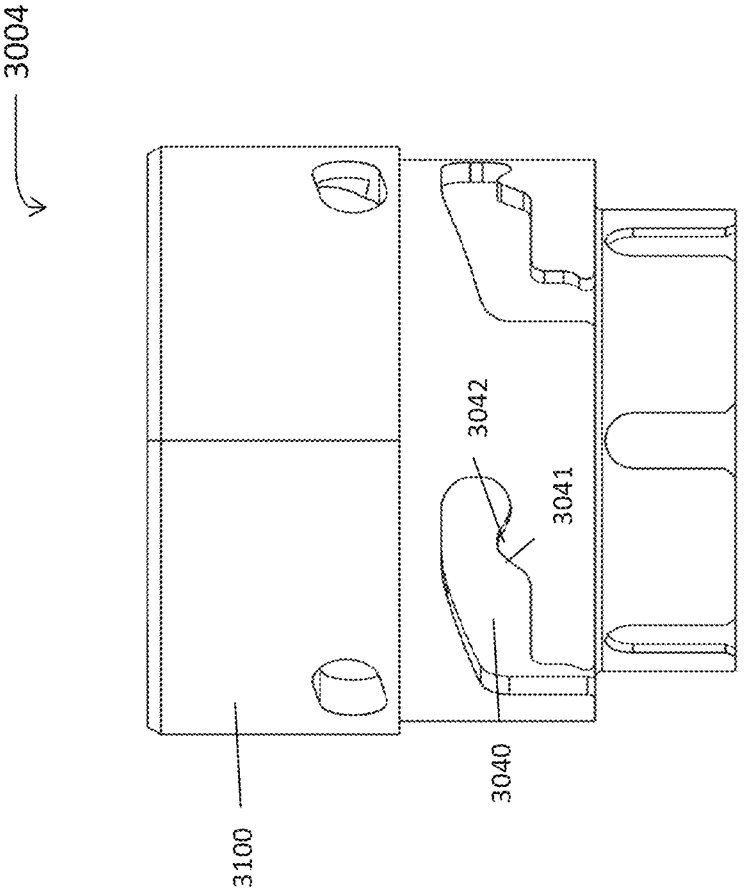
FIG. 33 is a front view of the inner collar of FIG. 32.
Figure 35:
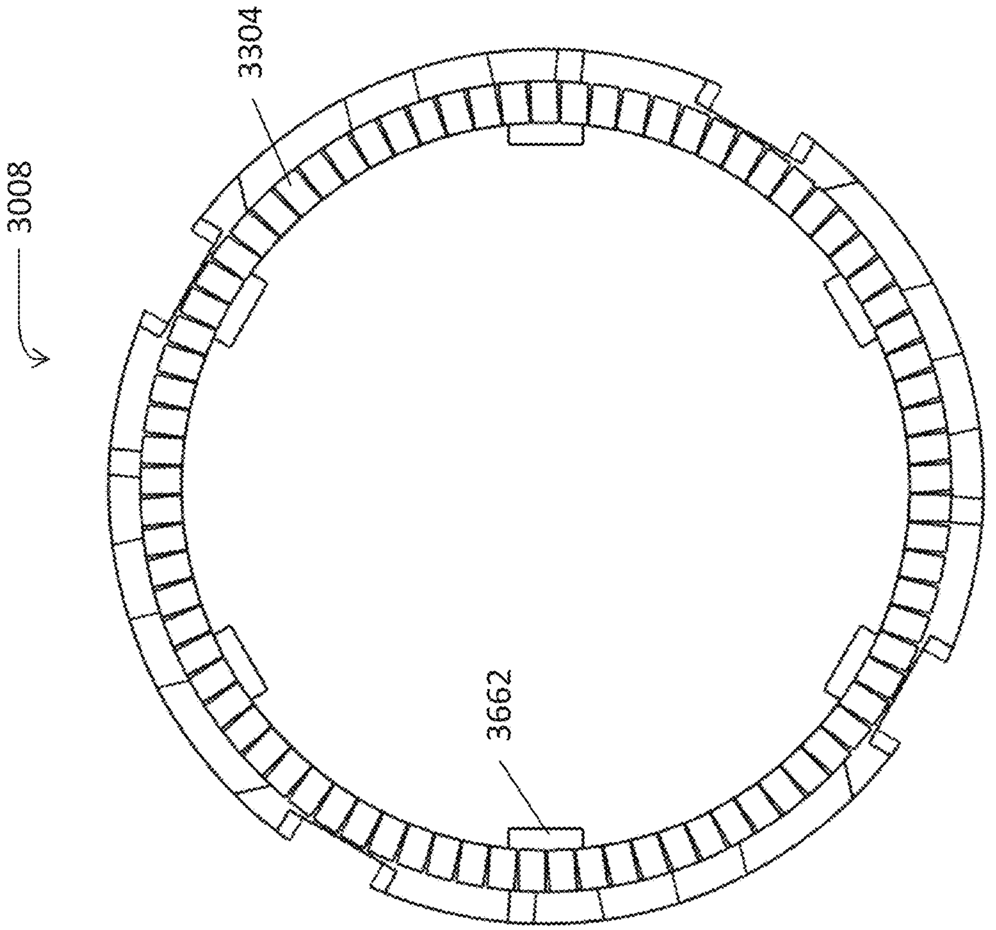
FIG. 35 is a bottom view of the first ratchet ring of FIG. 34.

As illustrated in FIG. 42, the first set of bayonet pins 3120*a* are moveable in respective bayonet channels formed in the inner collar 3040 (see also FIG. 33). As shown in FIG. 33, the bayonet channels 3040 may include a ramped surface 3041 and a ledge 3042. As with the above, the angle of the ramp may be tailored such that the connector coupling is able to reach a desired torque and the connectors are fully bottomed once when the bayonet pin reaches and thereafter moves over the ledge 3042. FIG. 43 illustrates the bayonet pin travelling up the ramped surface as the outer collar is rotated and the locking members (e.g., ratchet teeth) of the first and second ratchet rings are moved closer to one another. FIG. 43 illustrates the bayonet pin reaching the ledge of the bayonet channel and FIG. 44 illustrates the bayonet pin having moved over the ledge once the required torque needed to fully bottom the connector is reached and full engagement between the locking members of the first and second ratchet rings is achieved.

In some embodiments, connector may be arranged to provide an audible and/or tactile notification when the bayonet pin 3120*a* travels over the ledge and the connectors are fully bottomed.

FIGS. 41-43 also illustrate movement of the second set of bayonet pins 3120*b* in the respective bayonet channels 3088 formed in the first ratchet ring (see also FIG. 34). As described above, the wave spring may be arranged to bias the first and second ratchet rings towards one another. In other words, the spring may bias the teeth of the first and second ratchet rings into an engaged position. To allow the teeth to remain disengaged during mating (e.g., movement of the outer collar in the mating direction), the bayonet channel may include a ramped contact surface 3089 that the bayonet pins 3120*b* may engage with as the bayonet pins moves in the bayonet channel. In this regard, the ramped contact surface may provide resistance against the bias of the wave spring.

In some embodiments, the angle of the ramped contact surface of the bayonet channel in the first ratchet ring corresponds to travel path of the first set of bayonet pins 3120*a* in the corresponding bayonet channel in the inner collar. For example, once the bayonet pins 3120*a* have moved over the ledge of the corresponding bayonet channel, the ramped contact surface need not provide resistance against the wave spring. In other words, the connector coupling need not further delay engagement between the teeth of the ratchet rings. In this regard, and as shown in FIG. 34, the slope of the ramped contact surface decreases until the ramped contact surface is substantially parallel to the first, flat surface of the first ratchet ring. As also shown in FIG. 34, the height of the channel increases as the slope of the contact surface decreases. As shown in FIG. 44, the height of the channel is greatest once the first bayonet pin 3120*a* has moved over the ledge of the bayonet channel in the inner collar. As shown in FIG. 44, in this engaged position, both the first and second bayonet pins are seated at the closed end of the channel and the ratchet teeth are engaged.

In some embodiments, to unmate the connectors, the user may rotate the coupling connector in an unmating direction, which may cause the second bayonet pin 3120*b* to engage with the ramped contact surface 3089 of the corresponding bayonet channel 3088. In such embodiments, the locking members of the ratchet rings may be separated, which may allow the first bayonet pin 3201*a* to travel back over the ledge and to the open end of the bayonet channel. In some embodiments, the second bayonet pins may be locked in their respective positions relative to each other. Accordingly, separation and travel back over the ledge may happen simultaneous for each of the bayonet pins. In such embodiments, this separation of the ratchet teeth may allow for the connectors to be unmated.

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art. Accordingly, the foregoing description and drawings are by way of example only.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as “first,” “second,” “third,” etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of “including,” “comprising,” or “having,” “containing,” “involving,” and variations thereof herein, is meant to encompass the items listed thereafter and equivalents thereof as well as additional items.

What is claimed is:

1. A connector coupling for coupling a first connector to a second connector, the connector coupling comprising:

a first collar;

a second collar arranged to receive the first collar, the second collar being rotatable relative to the first collar; and a locking mechanism having a first ratchet ring with one or more first locking members that are engageable with one or more second locking members of the first collar or of a second ratchet ring;

wherein the connector coupling is arranged to move in a first direction to mate the first and second connectors and to move in a second direction to unmate the first and second connectors;

wherein the one or more first locking members and the one or more second locking members are biased towards an engaged position; and wherein, when the connector coupling is moved in the first direction and when the connector coupling is moved in the second direction, the locking mechanism is disengaged by separation of the one or more first locking members from the one or more second locking members.

2. The connector coupling of claim 1, wherein the one or more first locking members are arranged to move from the engaged position to a disengaged position when the connector coupling is moved in the first direction.

3. The connector coupling of claim 2, wherein the second collar is moveable in the first direction to move the first ratchet ring from the engaged position to the disengaged position.

4. The connector coupling of claim 2, wherein, when the connector coupling is moved in the first direction, the one or more locking members of the first ratchet ring are arranged to move away from the one or more second locking members to be separated from the one or more second locking members.

5. The connector coupling of claim 2, wherein, when the connector coupling is moved in the first direction, the locking members of the first ratchet ring are spaced apart from the locking members of the first collar or the locking members of the second ratchet ring.

6. The connector coupling of claim 2, wherein the one or more locking members of the first collar, the first ratchet ring, and/or the second ratchet ring include ratchet teeth.

7. The connector coupling of claim 2, wherein the one or more locking members of the first ratchet ring and the one or more locking members of the first collar are biased in the engaged position via a spring, or wherein the one or more locking members of the first ratchet ring and the one or more locking members of the second ratchet ring are biased in the engaged position via a spring.

8. The connector coupling of claim 2, wherein the first ratchet ring is at least one of axially and radially moveable when the first ratchet ring is moved from the engaged position to the disengaged position.

9. The connector coupling of claim 2, wherein:

the first collar includes a first channel; and the first ratchet ring includes a second channel.

10. The connector coupling of claim 9, wherein each of the first and second channels includes a bayonet channel.

11. The connector coupling of claim 9, wherein the second collar includes a first pin arranged to engage with the first channel and a second pin arranged to engage with the second channel.

12. The connector coupling of claim 10, wherein the first channel includes a ramp and a ledge.

13. The connector coupling of claim 10, wherein the second channel includes a ramped contact surface arranged to engage with the second pin.

14. The connector coupling of claim 1, wherein the locking mechanism is arranged to remain disengaged until the connector is fully mated.

15. The connector coupling of claim 1, wherein the second direction is opposite to the first direction.

16. The connector coupling of claim 15, wherein the first collar includes a first channel disposed in a body of the first collar.

17. The connector coupling of claim 16, wherein the first channel includes a mating path and an unmating path.

18. The connector coupling of claim 17, wherein the second collar includes a first pin receivable in the first channel, wherein the first pin is moveable in the mating path when the connector coupling is moved in the first direction.

19. The connector coupling of claim 17, wherein the second collar includes a first pin receivable in the first channel, wherein the first pin is moveable in the unmating path when the connector coupling is moved in the second direction.

20. The connector coupling of claim 1, wherein the locking mechanism is engaged after the first and second connectors are fully mated.

21. The connector coupling of claim 1, wherein the connector coupling is disposed on a body of first and/or second connectors.

22. The connector coupling of claim 1, wherein the locking members of the first and second ratchet rings are engageable with one another.

23. The connector coupling of claim 1, further comprising an indicator arranged to indicate a mating status of the connector coupling.

24. A connector coupling comprising:

a first collar having one or more locking members and a first channel, the first channel having a mating path and an unmating path;

a second collar arranged to receive the first collar, the second collar being rotatable relative to the first collar, the second collar having a first pin receivable in the first channel; and a ratchet ring having one or more locking members engageable with the locking members of the first collar;

wherein the connector coupling is arranged to move in a first direction to mate first and second connectors and a second, opposite, direction to unmate the first and second connectors; and wherein the first pin is arranged to move in the mating path when the connector coupling is moved in the first direction and in the unmating path when the connector coupling is moved in the second direction.

25. A connector coupling comprising:

a first collar;

a second collar arranged to receive the first collar, the second collar being rotatable relative to the first collar, the second collar having first and second pins; and a locking mechanism having first and second ratchet rings, wherein each of the first and second ratchet rings includes locking members that engage with one another;

wherein the first pin is arranged to engage with a first channel formed in the first ratchet ring;

wherein the second pin is arranged to engage with a second channel formed in the first collar; and wherein the first channel includes a ramped contact surface arranged to engage with the first pin.

26. A connector coupling comprising:

a first collar;

a second collar arranged to receive the first collar, the second collar being rotatable relative to the first collar; and a locking mechanism having a first ratchet ring with one or more first locking members that are engageable with one or more second locking members on a second ratchet ring or the first collar;

a spring configured to bias the one or more first locking members and the one or more second locking members together into an engaged position;

wherein the connector coupling is arranged to move in a first direction to mate first and second connectors and to move in a second direction to unmate the first and second connectors; and wherein, when the connector coupling is moved in the first direction and when the connector coupling is moved in a second direction, the one or more first locking members and the one or more second locking members are arranged to separate such that the locking mechanism remains disengaged until the connector is fully mated.

* * * * *